(12) United States Patent
Bhargava

(10) Patent No.: US 9,786,050 B2
(45) Date of Patent: Oct. 10, 2017

(54) STAIN-FREE HISTOPATHOLOGY BY CHEMICAL IMAGING

(71) Applicant: The Board of Trustees of the University of Illinois, Urbana, IL (US)

(72) Inventor: Rohit Bhargava, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 110 days.

(21) Appl. No.: 14/211,292

(22) Filed: Mar. 14, 2014

(65) Prior Publication Data

US 2014/0270457 A1   Sep. 18, 2014

Related U.S. Application Data

(60) Provisional application No. 61/794,171, filed on Mar. 15, 2013.

(51) Int. Cl.
*G06K 9/00* (2006.01)
*G06T 7/00* (2017.01)

(52) U.S. Cl.
CPC .......... *G06T 7/0014* (2013.01); *G06K 9/0014* (2013.01); *G06K 9/00127* (2013.01); *G06T 2207/10024* (2013.01); *G06T 2207/10048* (2013.01); *G06T 2207/10056* (2013.01); *G06T 2207/20081* (2013.01); *G06T 2207/20084* (2013.01); *G06T 2207/30024* (2013.01)

(58) Field of Classification Search
CPC ...... G06K 9/00127; G06T 2207/10048; G06T 2207/10056; G06T 2207/30024
See application file for complete search history.

(56) References Cited

U.S. PATENT DOCUMENTS

| | | | | |
|---|---|---|---|---|
| 3,975,762 A | * | 8/1976 | van den Bosch | H04N 9/43 348/32 |
| 5,075,214 A | * | 12/1991 | Connor | C12Q 1/70 435/29 |
| 5,218,529 A | * | 6/1993 | Meyer | G06N 3/02 700/90 |
| 5,784,162 A | * | 7/1998 | Cabib | C12Q 1/6841 250/461.2 |

(Continued)

OTHER PUBLICATIONS

Bellisola et al., "Tracking InfraRed Signatures of Drugs in Cancer Cells by Fourier Transform Microspectroscopy," *Analyst* 135:3077-3086, 2010.

(Continued)

*Primary Examiner* — Gandhi Thirugnanam
(74) *Attorney, Agent, or Firm* — Guntin & Gust, PLC; Robert Gingher

(57) ABSTRACT

The present disclosure provides methods, systems, and computer-readable storage media that can be used to image an unstained sample. The disclosed methods can include obtaining a spectroscopic image (e.g., infrared (IR) imaging data) of the sample, analyzing the resulting spectroscopic image to reduce the dimensionality of the spectroscopic image, comparing the reduced spectroscopic image compared to a control (e.g., by using an appropriately trained algorithm) and generating an output computed stain image from the reduced IR spectra, thereby imaging the sample without the use of stains or dyes.

19 Claims, 3 Drawing Sheets
(2 of 3 Drawing Sheet(s) Filed in Color)

OVERVIEW OF METHOD

ACQUIRE SPECTROSCOPIC IMAGE (E.G., IR ABSORBANCE IMAGE) OF THE UNSTAINED SAMPLE — 110

REDUCE DIMENSIONALITY OF THE SPECTROSCOPIC IMAGE — 112

COMPARE REDUCED SPECTROSCOPIC IMAGE TO A CONTROL OR DATABASE — 114

GENERATE OUTPUT COMPUTED STAIN IMAGE — 116

(56) References Cited

U.S. PATENT DOCUMENTS

| | | | | |
|---|---|---|---|---|
| 5,976,885 A * | 11/1999 | Cohenford | ................ | G01J 3/28 436/171 |
| 5,991,028 A * | 11/1999 | Cabib | ................ | C12Q 1/6816 356/456 |
| 6,146,897 A * | 11/2000 | Cohenford | ................ | G01J 3/28 250/338.1 |
| 6,463,438 B1 | 10/2002 | Veltri et al. | | |
| 6,690,817 B1 * | 2/2004 | Cabib | ................ | G01B 11/0675 382/134 |
| 7,693,334 B2 | 4/2010 | Ogura et al. | | |
| 2003/0026762 A1 * | 2/2003 | Malmros | ............. | A61B 5/0059 424/9.6 |
| 2006/0210153 A1 * | 9/2006 | Sara | .......................... | G01J 3/46 382/165 |
| 2007/0127022 A1 * | 6/2007 | Cohen | ...................... | G01J 3/02 356/326 |
| 2007/0135999 A1 * | 6/2007 | Kolatt | .................... | G01N 21/31 702/19 |
| 2008/0015448 A1 * | 1/2008 | Keely | ................ | A61B 5/0091 600/477 |
| 2008/0273199 A1 * | 11/2008 | Maier | ...................... | G01J 3/02 356/301 |
| 2008/0319324 A1 * | 12/2008 | Maier | ................ | A61B 5/0059 600/477 |
| 2009/0002702 A1 * | 1/2009 | Maier | .................... | A61B 5/417 356/301 |
| 2009/0024375 A1 * | 1/2009 | Kremer | ................... | G06F 19/16 703/11 |
| 2011/0080581 A1 * | 4/2011 | Bhargava | ................ | G01J 3/02 356/302 |
| 2011/0182490 A1 * | 7/2011 | Hoyt | ................ | G06K 9/00147 382/128 |
| 2012/0052063 A1 * | 3/2012 | Bhargava | ............ | G06K 9/6277 424/133.1 |
| 2012/0092663 A1 * | 4/2012 | Kull | ....................... | G01N 21/65 356/301 |
| 2012/0143082 A1 * | 6/2012 | Notingher | .......... | G01N 29/2418 600/562 |
| 2012/0200694 A1 * | 8/2012 | Garsha | ............... | G01N 21/6456 348/79 |
| 2012/0212733 A1 * | 8/2012 | Kodali | ................... | B82Y 15/00 356/301 |
| 2012/0226644 A1 * | 9/2012 | Jin | ........................... | G06N 3/08 706/19 |
| 2012/0290607 A1 * | 11/2012 | Bhargava | ............. | G06F 19/345 707/769 |
| 2013/0022250 A1 * | 1/2013 | Nygaard | ................ | A61J 3/007 382/128 |
| 2014/0270457 A1 * | 9/2014 | Bhargava | ............. | G06K 9/0014 382/133 |
| 2014/0336261 A1 * | 11/2014 | Chin | .................... | A61B 5/0073 514/604 |
| 2015/0268226 A1 * | 9/2015 | Bhargava | ........... | G01N 33/5091 514/789 |

OTHER PUBLICATIONS

Bellisola and Sorio, "Infrared Spectroscopy and Microscopy in Cancer Research and Diagnosis," *Am J Cancer Res.* 2:1-21, 2012.

de Smit et al., "Nanoscale Chemical Imaging of a Working Catalyst by Scanning Transmission X-ray Microscopy," *Nature* 456:222-225, 2008.

Diem et al., "A Decade of Vibrational Micro-Spectroscopy of Human Cells and Tissue (1994-2004)," *Analyst* 129:880-885, 2004.

Evans et al., "Chemical Imaging of Tissue in Vivo with Video-Rate Coherent Anti-Stokes Raman Scattering Microscopy," *Proc Natl Acad Sci USA* 102:16807-16812, 2005.

Fernandez et al., "Infrared Spectroscopic Imaging for Histopathologic Recognition," *Nat Biotech.* 23:469-474, 2005.

Ifa et al., "Latent Fingerprint Chemical Imaging by Mass Spectrometry," *Science* 321:805-805, 2008.

Jamin et al., "Highly Resolved Chemical Imaging of Living Cells by Using Synchrotron Infrared Microspectrometry," *Proc Natl Acad Sci USA* 95:4837-4840, 1998.

Lewis et al., "Fourier Transform Spectroscopic Imaging Using an Infrared Focal-Plane Array Detector," *Anal Chem.* 67:3377-3381, 1995.

\* cited by examiner

STAIN-FREE HISTOPATHOLOGY BY CHEMICAL IMAGING

CROSS REFERENCE TO RELATED APPLICATION

This application claims the benefit of U.S. Provisional Application No. 61/794,171, filed Mar. 15, 2013, which is herein incorporated by reference in its entirety.

ACKNOWLEDGMENT OF GOVERNMENT SUPPORT

This invention was made with government support under 1R01EB009745 awarded by The National Institutes of Health. The government has certain rights in the invention.

FIELD

The disclosure provides methods of imaging biological samples to provide a molecular composition of the sample without the use of stains.

BACKGROUND

Clinical decisions and biomedical research rely significantly on imaging the architecture and morphology of tissues. Unfortunately, tissues have little contrast in brightfield optical imaging (FIG. 1A), and require the use of stains or dyes to provide contrast. Contrast agents include those that highlight morphology as well as those that highlight specific molecular species, usually using immunohistochemical (IHC) techniques (Dabbs, *Diagnostic Immunohistochemistry: Theranostic and Genomic Applications—Expert Consult.*, Elsevier Health Sciences, 2010). The use of staining is especially critical in histopathologic analyses that are the gold standard for the diagnoses of many diseases, including cancer, and for most tissue research. Usually, the pathologist examines tissue architecture and histology (cell types) to provide an initial diagnosis which may be augmented by modern computerized analyses (Camp et al., *Nat Med* 8:1323-8, 2002). In some cases, confirmatory IHC staining may be employed to determine appropriate therapy or to improve diagnostic accuracy or to guide appropriate therapy. While advances have been made (Ruifrok et al., *Anal Quant Cytol Histol* 23:291-9, 2001; Taylor et al., *Histopathology* 49:411-24, 2006), the time required for staining and expense of obtaining multiple stains can be a limiting factor and inconsistent staining due to a variety of technological and tissue factors is problematic (Goldstein et al., *Appl. Immunohistochem. Mol. Morphol.* 15:124-33, 2007). Staining patterns in some cases need to be interpreted in the context of multiple stains or appropriate morphologic visualization to be effective (Varma et al., *Histopathology* 47:1-16, 2005), compounding the need for multiplex marker staining and further interpretation.

SUMMARY

Provided herein are methods and systems for generating or obtaining an image of a sample, such as biopsy tissue sections, without the use of dyes or stains (such as those currently used in histopathology and IHC). Spectroscopic imaging (such as Fourier transform infrared (FT-IR) spectroscopic imaging) is used to record the intrinsic chemical composition of sample, and numerical algorithms are employed to relate the biochemical content of the IR spectral data to structure of the sample, such as tissue structure or disease-relevant information (e.g., protein expression). This results in accurate histologic and pathologic classification, which is comparable in terms of the staining patterns in a sample (e.g., tissue) to what would be achieved if stains or dyes were used instead. Thus, the methods generate computationally-stained images of samples that allow both morphologic visualization currently enabled by dyes and molecular expression currently enabled by immunostaining (e.g., by using labeled antibodies).

The disclosed methods of spectroscopic imaging of unstained samples allow tissue or other samples to be classified based on quantitative and reproducible optical measurements of tissue properties and are not subject to staining or IHC irregularities. Small or large samples, multiple epitopes and single data acquisition can be used to perform a variety of assays. The disclosed computed staining methods and systems provide more robust input for automated diagnosis methods, for example by eliminating the need to perform color correction, sample-to-sample variation and adjust for staining artifacts.

In some examples, the methods of imaging an unstained sample include obtaining a spectroscopic image of the sample, for example an IR absorption image, thereby generating chemical information on every pixel in the data. Each pixel contains a spectrum. For example, an IR absorption image can be associated with an IR spectrum at every pixel. The resulting spectroscopic image is analyzed to reduce the dimensionality of the spectroscopic image, thereby generating a reduced spectroscopic image (e.g., reduced IR spectra). The reduced spectroscopic image can be compared to a control, for example by applying or inputting the image into an algorithm containing a set of parameters defining the network (wherein the algorithm was generated with appropriately stained control samples). The control can be obtained using existing molecular methods in pathology, including IHC staining and blotting analyses. Pathology methods provide information on whether the molecule of interest is present and the relative strength of its expression. The level of staining is correlated with specific spectroscopic features (such as IR spectra). Hence, each pixel can be assigned a stain level from the spectroscopic image (e.g., IR spectrum). Subsequently, an output computed stain image from the reduced spectroscopic image (e.g., reduced IR spectra) is generated, thereby imaging the sample without the use of stains or dyes.

In some examples the method can further include treating a subject identified as having a particular disease, such as a particular cancer or infection.

In some examples the method can further include selecting a subject suspected of having a particular disease, such as a particular cancer or infection and obtaining a sample from the subject.

The disclosure also provides systems for imaging an unstained sample. Such a system can include a means for obtaining a spectroscopic image of the unstained sample, implemented rules for reducing dimensionality of the spectroscopic image, implemented rules for comparing the reduced spectroscopic image to a control image (such as a stored control image or plurality of images), and means for implementing the rules, thereby generating an output computed stain image from the reduced spectroscopic image and imaging the unstained sample.

Also provided are computer-readable storage medium having instructions thereon for performing the disclosed methods, such as methods of imaging a sample without the use of dyes or stains.

The foregoing and other objects and features of the disclosure will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figures 1A, 1B, 1C, 1D, 1E:
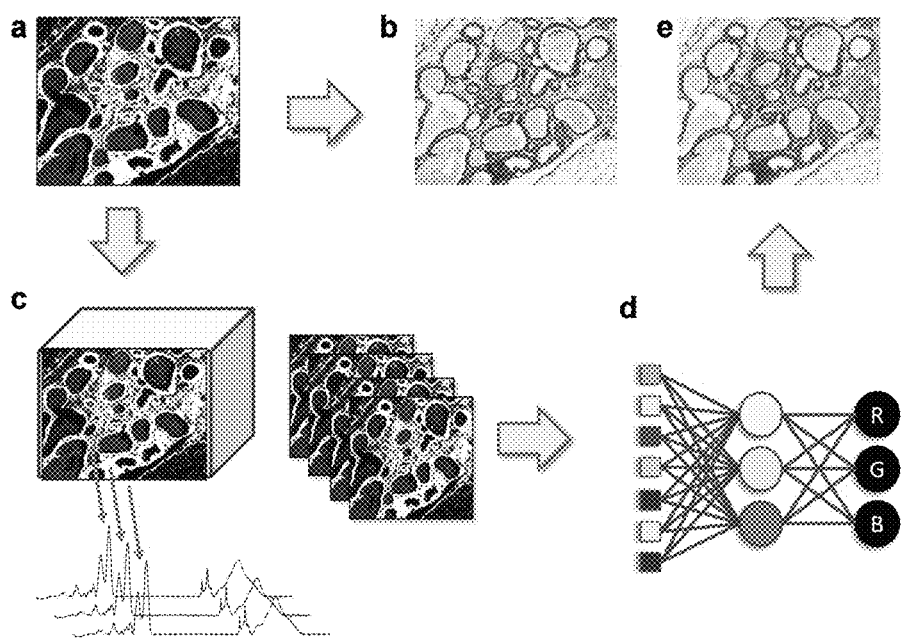
FIGS. 1A-1E show how the disclosed methods can be used in place of staining tissue samples. (A) Brightfield microscopy image of an unstained tissue section. (B) Tissue is stained, commonly with hematoxylin and eaosin (H&E), to visualize tissue morphology. (C) Spectroscopic imaging data recorded from unstained tissue, which includes a spectrum at every spatial location or an image at every chemically-specific feature in the spectrum (e.g., stack of chemically-specific images). (D) The data (underlying chemical composition) can be converted to conventional pathology images in an objective and automated manner using recognition algorithms. For example, in (E) the H&E stained image (similar to B) is reproduced without staining.
Figures 2A, 2B, 2C, 2D, 2E:
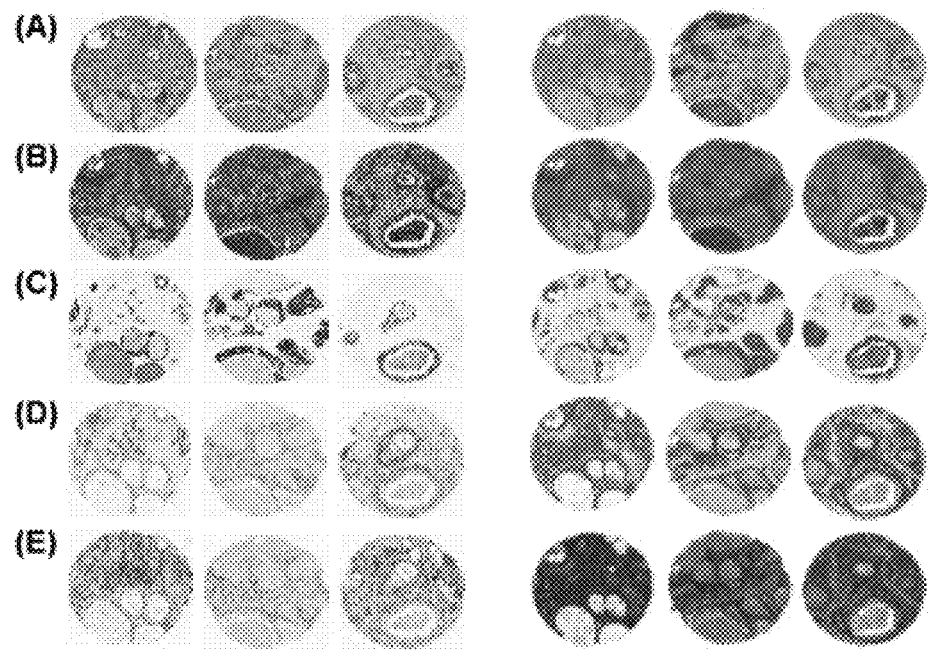
FIGS. 2A-2E are digital images showing that molecular imaging (three sample panel on the left) can be reproduced by chemical imaging (three sample panel on the right). In addition to H&E stained images (A), the method of stainless staining can also be used in place of molecularly-specific stains, including (B) Masson's Trichrome stain (collagen and keratin fibers) (C) high molecular weight (HMW) cytokeratin (epithelial-type cell), (D) smooth muscle alpha actin (myo-like cell) and (E) vimentin (fibroblast-like cell). Each spot is 1.4 mm in diameter.

Unless otherwise explained, all technical and scientific terms used herein have the same meaning as commonly understood by one of ordinary skill in the art to which a disclosed invention belongs. Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise. "Comprising" means "including"; hence, "comprising A or B" means "including A" or "including B" or "including A and B." All references cited herein are incorporated by reference.

Bacteria: Prokaryotic organisms that in some examples cause disease (pathogenic bacteria). Bacteria can be classified based on the structural characteristics of their cell walls. For example, the thick layers of peptidoglycan in the "Gram-positive" cell wall stain purple, while the thin "Gram-negative" cell wall appears pink.

Cancer: Malignant neoplasm, for example one that has undergone characteristic anaplasia with loss of differentiation, increased rate of growth, invasion of surrounding tissue, and is capable of metastasis.

Detect: To determine if an agent (such as a signal, protein, cellular structure, organism, or cell) is present or absent, for example a tumor cell. In some examples, this can further include quantification. For example, use of the disclosed methods in particular examples permits reporting of particular morphology and expression in a sample.

Control: A sample or standard used for comparison with an experimental or test sample. In some embodiments, the control is a normal sample obtained from a healthy patient (or plurality of patients), such as a sample or plurality of samples for subjects without a tumor or who are known to not be infected with a target pathogen. In some examples, images of control samples are stored in a database.

In some embodiments, the control is a historical control or standard reference value or range of values (such as a previously tested control sample(s), such as a known cancer, normal sample, or benign sample). In some embodiments the control is a standard value representing the average value (or average range of values) obtained from a plurality of patient samples, such as known normal samples or known cancer samples.

Diagnose: The process of identifying a medical condition or disease, for example from the results of one or more diagnostic procedures. In particular examples, diagnosis includes determining whether a sample obtained from a subject is a tumor, contains a particular pathogen (e.g., bacterium, virus, parasite, or fungus), or expresses a target protein (such as a tumor associated antigen, e.g., BRCA, CA-125, CEA).

Normal sample, cells or tissue: Non-tumor, non-malignant cells and tissue, as well as those not containing the target pathogen, cell, or protein.

Sample: A sample, such as a biological sample, includes those samples obtained from a subject or from an environmental sample, which can include cells, nucleic acids, and/or proteins. As used herein, biological samples include all clinical samples useful for detection of a cell or a disease, such as an infection or a tumor in subjects, including cells, cell lysates, cytocentrifuge preparations, cytology smears, tissue biopsies (e.g., core biopsy), fine-needle aspirates, tissue sections (e.g., cryostat tissue sections and/or paraffin-embedded tissue sections), and fluid samples. Samples include but are not limited to, cells, tissues, and bodily fluids, such as a tissue or tumor biopsy, fine needle aspirate, a core biopsy sample, an excisional biopsy sample, bronchoalveolar lavage, pleural fluid, spinal fluid, saliva, sputum, surgical specimen, lymph node fluid, ascites fluid, peripheral blood or fractions thereof (such as serum or plasma), urine, saliva, buccal swab, vaginal swab, breast milk, and autopsy material. Samples include biopsied or surgically removed tissue, including tissues that are, for example, unfixed, frozen, fixed in formalin and/or embedded in paraffin. In some examples, a tissue sample is a fresh sample, frozen sample, or fixed sample (e.g., embedded in paraffin).

Slide: Traditionally a substrate used to mount or attach a sample to for microscopy, which is typically but not necessarily transparent to light. Samples may be processed before and/or after mounting onto a slide. In some examples, a slide may be more or less transparent or opaque and made of glass, silica, quartz, or any other material amenable to Gram-staining. A slide may be configured to accommodate one or more specimens from one or more subjects. A slide as used herein also includes non-traditional substrates such as a tape, a disc, a plate, or any other flat, curved, rectangular, or round surface or shape amenable to presenting a sample for analysis using the disclosed methods.

Stain: A dye or other label used in microscopy, for example to enhance contrast in the microscopic image or to detect particular structures in biological tissues, such as cell populations (e.g., cancerous cells), organelles within cells, particular proteins, particular nucleic acids, lipids, or carbohydrates). Exemplary stains used in histology, cytology, haematology and research include but are not limited to: H&E, iodine, methylene blue, eosin Y, Congo Red, carmine, toluidene blue, Wright's stain, crystal violet, aceto-orcein, Sudan III, and the like.

1,4-Phenylenediamine; 2,3,5-triphenyltetrazolium chloride; 2,4-Dinitro-5-fluoroaniline; 2-Naphthol (beta); 3,3'-diaminobenzidine; 4-chloro-1-naphthol; 4-Chloro-1-naphthol; acridine orange; silver proteinate; Alcian Blue 8GX; lizarin; alizarin Red S; Alkali Blue 4 B; ammonium molybdate tetrahydrate; aniline hydrochloride; auramine O; azocarmine B; azocarmine G; azophloxine; azure A; azure B; azure II; azure II-eosin; azure mixture sicc. Giemsa Stain; bengal Rose B, benzopurpurine 4B; Prussian Blue, Bismarck Brown Y (G); Bismarck Brown R; bismuth(III) nitrate basic; lead(II) acetate Trihydrate; lead(II) citrate trihydrate; lead(II) nitrate; lead(II) tartrate; lead tetraacetate; borax Carmin solution; brilliant green; brilliant cresyl blue; bromocresol green; bromocresol Green Sodium salt; bromocresol purple; bromophenol blue; bromosulfalein; bromothymol blue; Carbol-Fuchsin; carbol-gentianaviolet solution; carbol-Methylene Blue Solution; carmine; celestine blue; quinacrine mustard dihydrochloride, quinoline yellow; chlorazol black; chromium(VI) oxide; chromotrop 2 R; chrysoidine G; cobaltous chloride; cobalt naphthenatel cyanosine; cytochrome c; direct red; direct red 80; fast blue B; fast blue BB; fast blue RR; fast green; fast red 3 GL; fast red RC; fast violet B; eosin; eosin yellowish; eosin-hematoxylin; eosin methylene blue; eosin scarlet; eriochrome red B; erythrosin extra bluish; acetic acid; ethyl violet; Evans blue fluka; ferritin; fat red bluish; fat black for microscopy; fluorescein isothiocyanate; fuchsin; gallocyanine; gentian violet; Giemsa-Solution; gold; hemalaun; hematein; hematoxylin; Hanker-Yates Reagent; Hayem's Solution; hesperidin; indigocarmine; indium(III) chloride; iodonitrotetrazolium chloride; iso-chloridazon; Janus Green B; potassium dichromate; potassium hexahydroxoantimonate (V); potassium permanganate; carmine Solution; nuclear fast red; Congo Red; cresol red; cresyl violet; crystal violet; lactophenol blue; lanthanum nitrate hexahydrate; light green SF yellowish; lipid crimson; lithium carbonate; Lugol Solution; malachite green oxalate; May-Grünwald Solution; metanil Yellow; methylene blue; methylene green zinc double salt; methyl Green; methyl orange; methyl violet; morin; mucicarmine; N-(4-Amino-2,5-diethoxyphenyl)benzamide; N,N-dimethylaniline; N,N-dimethyl-p-toluidine; Naphthol AS-acetate; various Naphthol dyes such as naphthol AS-TR-phosphate, naphthol blue black, naphthol yellow S, and naphthol green B; sodium tungstate dihydrate; neotetrazolium chloride; new Coccine; new fuchsine; new methylene blue N; neutral red; nigrosin B; Nile Blue A; Nile Blue chloride; ninhydrin; nitrazine yellow; nitrotetrazolium blue chloride; orange G; orcein; palladium(II) chloride; palladium(II) oxide; parafuchsin; peroxidase; phenosafranine; phosphomolybdic acid; phosphorus pentoxide; phosphotungstic acid; phthalocyanine; picric acid; pinacyanol iodide; platinum(IV) oxide hydrate; ponceau BS; ponceau S; pyridine; pyronine Y (G); resorufin; rhodamine B; ruthenium(III) chloride anhydrous; ruthenium red; safranin T; Safranin Solution acc. to Olt; acid fuchsin; scarlet R; Schiff's reagent; silver; silver nitrate; Sirius Rose BB; Sudan Blue II; Sudan Orange G; Sudan Red B; Sudan Black B; sulforhodamine B acid chloride; tartrazine; tetranitroblue tetrazolium chloride; tetrazolium Blue chloride; tetrazolium Violet; thallium(I) nitrate; thiazole Yellow G; thiazolyl blue tetrazolium bromide; thiocarbohydrazide; thioflavine; thionine acetate; toluidine blue; tropaeolin 000 No. 1 and No. 2; trypan Blue; Tuerk Solution; uranyl acetate dihydrate; uranyl nitrate Hexahydrate; variamine Blue B salt; vesuvine Solution acc. to Neisser; Victoria Blue B; water blue; Weigert's Solution; Tungstosilicic acid hydrate; Wright Stain; and xylenecyanol FF.

Stains also include detectable labels attached to proteins (e.g., antibodies) or nucleic acid molecules, to permit detection of target proteins or nucleic acids. Exemplary labels include but are not limited to haptens, fluorophores, radioisotopes enzymes, and quantum dots.

The disclosed methods do not use stains to image samples, but still permit detection of particular structures in biological tissues, such as cell populations (e.g., cancerous cells), organelles within cells, particular proteins, particular nucleic acids, lipids, carbohydrates, and the like.

Subject: Includes any multi-cellular organism, such as a vertebrate or mammal, such as human and non-human mammals (e.g., veterinary subjects, such as dogs, cats, mice, rodents, cows, pigs and the like). In some examples, a subject is one who has or is suspected of having a disease, such as a tumor, or of being infected with a pathogen, such as a bacterial infection. Biological samples from subjects can be analyzed using the disclosed methods.

Tumor: An abnormal growth of cells, which can be benign or malignant. Cancer is a malignant tumor, which is characterized by abnormal or uncontrolled cell growth. Other features often associated with malignancy include metastasis, interference with the normal functioning of neighboring cells, release of cytokines or other secretory products at abnormal levels and suppression or aggravation of inflammatory or immunological response, invasion of surrounding or distant tissues or organs, such as lymph nodes, etc. "Metastatic disease" refers to cancer cells that have left the original tumor site and migrate to other parts of the body for example via the bloodstream or lymph system. A tumor that does not metastasize is referred to as "benign."

Examples of hematological tumors include leukemias, including acute leukemias (such as 11q23-positive acute leukemia, acute lymphocytic leukemia, acute myelocytic leukemia, acute myelogenous leukemia and myeloblastic, promyelocytic, myelomonocytic, monocytic and erythroleukemia), chronic leukemias (such as chronic myelocytic (granulocytic) leukemia, chronic myelogenous leukemia, and chronic lymphocytic leukemia), polycythemia vera, lymphoma, Hodgkin's disease, non-Hodgkin's lymphoma (indolent and high grade forms), multiple myeloma, Waldenstrom's macroglobulinemia, heavy chain disease, myelodysplastic syndrome, hairy cell leukemia and myelodysplasia.

Examples of solid tumors, such as sarcomas and carcinomas, include fibrosarcoma, myxosarcoma, liposarcoma, chondrosarcoma, osteogenic sarcoma, and other sarcomas, synovioma, mesothelioma, Ewing's tumor, leiomyosarcoma, rhabdomyosarcoma, colon cancer, rectal cancer, anal cancer, lymphoid malignancy, pancreatic cancer, breast cancer (including basal breast carcinoma, ductal carcinoma and lobular breast carcinoma), lung cancers, ovarian cancer, uterine cancer, prostate cancer, hepatocellular carcinoma, squamous cell carcinoma, basal cell carcinoma, adenocarcinoma, sweat gland carcinoma, medullary thyroid carcinoma, papillary thyroid carcinoma, pheochromocytomas sebaceous gland carcinoma, papillary carcinoma, papillary adenocarcinomas, medullary carcinoma, bronchogenic carcinoma, renal cell carcinoma, hepatoma, bile duct carcinoma, choriocarcinoma, Wilms' tumor, cervical cancer, testicular tumor, seminoma, bladder carcinoma, and CNS tumors (such as a glioma, astrocytoma, medulloblastoma, craniopharyrgioma, ependymoma, pinealoma, hemangioblastoma, acoustic neuroma, oligodendroglioma, meningioma, melanoma, neuroblastoma and retinoblastoma).

In specific examples, the tumor is melanoma, breast cancer, prostate cancer, esophageal cancer, liver cancer, gastrointestinal cancer, colon cancer, rectal cancer, or a lung carcinoma. In another example, a tumor is a skin tumor. In another example, a tumor is a papilloma.

Suitable methods and materials for the practice and/or testing of embodiments of the disclosure are described below. Such methods and materials are illustrative only and are not intended to be limiting. Other methods and materials similar or equivalent to those described herein also can be used. For example, conventional methods well known in the art to which a disclosed invention pertains are described in various general and more specific references.

Overview of the Technology

Staining tissue to highlight its morphology or molecular content is standard practice in most clinical diagnoses and biomedical research (Kumar, V., Abbas, A. K., Fausto, N. & Aster, J. *Robbins and Cotran Pathologic basis of disease*. Saunders, 200)). While dyes such as hematoxylin and eosin (H&E) have been commonly used for over a hundred years, more recently, specific epitopes are used to visualize molecular markers in research and clinical practice (Bratthauer, et al. *Hum. Pathol.* 33:620-7, 2002). The disclosure provides a third method for imaging samples, for example using microscopy, without the need for stains or dyes (labels) commonly used in histopathology, immunohistochemical (IHC) and in situ hybridization (e.g., FISH, SISH) methods. In this approach, spectroscopy is used to record the intrinsic chemical composition of tissue and numerical algorithms are employed to relate the biochemical content of the data to tissue composition. The method generates computationally-"stained" images of tissue that allows for accurate morphologic visualization and high fidelity molecular expression normally afforded by dyes and immunostaining, respectively. Since the tissue is not actually stained and the histopathologic information is algorithmically obtained, this method can be referred to as stain-less staining, stain-free chemical imaging, or stainless computed molecular histopathology.

Stainless computed histopathology enables a rapid, quantitative and non-perturbing visualization of morphology and multiple molecular epitopes simultaneously. The disclosed methods can provide morphological visualization and molecular expression, for example used in clinical diagnoses and biomedical research. Currently available imaging methods used for clinical decisions and biomedical research often rely on imaging a tissue's architecture and morphology. However, because tissues do not have enough contrast in brightfield optical imaging, currently available methods rely on stains and dyes to add contrast. Unfortunately, the use of stains and dyes requires time and expense, and there are issues with inconsistent staining between samples and laboratories, for example due to technological and tissue factors.

In the disclosed methods, spectroscopy is used to record the intrinsic chemical composition of tissue and algorithms are employed to relate the biochemical content of the data to tissue structure or disease-relevant information. The methods generate computationally-stained images of tissue that allow both morphologic visualization currently enabled by dyes and molecular expression currently enabled by immunostaining. Since the tissue is not actually stained and the histopathologic information is algorithmically obtained, the sample can be analyzed numerous times (potentially limitless numbers of times), without any loss in sample integrity. Stainless computed pathology provides a rapid, quantitative and non-perturbing visualization of morphology and multiple molecular epitopes for research and clinical tasks.

As opposed to imaging with dyes or stains, the disclosure provides an alternative in the form of chemical imaging (Lewis et al., *Anal. Chem.* 67:3377-81, 1995; Evans et al., *PNAS* 102:16807-12, 2005; Ifa et al., *Science* 321:805, 2008; and De Smit et al., *Nature* 456:222-5, 2008). The methods provided in these references teach how to generate chemical contrast in tissue or samples. However, the methods provided therein do not teach how to obtain molecular contrast that is traditionally obtained by staining. In chemical imaging, optical imaging is combined with spectroscopy to provide both the morphologic detail of microscopy and the molecular selectivity of spectroscopy. In particular, the optical frequencies of the mid-infrared region of the spectrum are in the range of molecular vibrational frequencies. Hence, if a molecular species is present, light is absorbed in a pattern consistent with its molecular constitution. While a microscope provides straightforward imaging capability, (Bhargava, *Appl. Spectrosc.* 66:1091-1120, 2012) the absorption spectrum can be used as a pattern of composition as well as a readout of metabolic activity (Ellis et al., *Analyst* 131:875-85, 2006). Combined with numerical algorithms, the data can be used to recognize a range of structures used for research and clinical applications, including bacteria and other pathogens, isolated aberrant cells, tissue structures and disease (such as a tumor or cancer) (Jamin et al., *PNAS* 95:4837-4840, 1998; Bellisola et al., *Analyst* 135:3077-86, 2010 and Diem et al., *Analyst* 129:880-5, 2000). The contrast mechanism between different components in a sample is straightforward and instrumentation is readily available and underlying principles are largely understood. While the data have been used by numerous groups to relate spectral properties to cell type and disease state, the belief has largely been that this information is in addition to or complementary to conventional laboratory and clinical analyses (Biomedical Vibrational Spectroscopy. John Wiley & Sons, 2008). Here it is shown that the data can also be used to generate the same information as classical dyes and various molecular stains.

For example, the transformation shown in FIGS. 1A-1B is the current way of visualizing tissues using brightfield microscopy (FIG. 1A) and H&E staining (FIG. 1B) of samples. In contrast, FIGS. 1C-1E show how the disclosed methods can be used to obtain an image (FIG. 1E) that looks similar to the H&E image (FIG. 1B), without staining the tissue.

Providing multiple, registered epitopes can overcome shortcomings in automated algorithms (Beck et al., *Sci. Transl. Med.* 3:108ra113-108ra113, 2011). It is shown therein that many stains can be replaced with computed histopathology. Such methods can be used for in situ histopatholgy (e.g., within the body), and to obtain greater molecular sensitivity. While computing has been used post-acquisition for improved analysis in pathology, computed molecular histopathology offers a paradigm shift in methodology that has the potential to change long-standing practices in pathology. While compatible with current analytical approaches—whether manual or computerized (Gurcan et al., *Biomedical Engineering, IEEE Reviews* 2:147-171, 2009), it also enables pathology to move closer to real-time, in situ assessment. Further developments in computed histopathology have the potential to make on-demand staining and assessments routine.

Methods of Stain-Free Imaging

Provided herein are methods of imaging a sample, such as a sample that has not been stained or contacted with a dye or label, such as those typically used in histopathology, IHC, and ISH. In particular examples, the method includes obtaining a spectroscopic image (such as an infrared (IR) imaging dataset) of the sample, which contains a spectrum at every pixel. An image plotted using any combination of the information in the spectrum can be referred to as an IR image. The dimensionality of the spectroscopic image (e.g., IR image) can be reduced, thereby generating a reduced spectroscopic image (e.g., reduced IR image). The reduced spectroscopic image is compared to one or more controls, for example using a statistical pattern recognition approach. The spectra in the spectroscopic image (entire or reduced) are related to known staining patterns in the sample. Spectral features that allow prediction of the staining patterns are found using statistical pattern recognition approaches, such as Bayesian, support vector machine or artificial neural network (e.g., see Webb and Copsey, Statistical Pattern Recognition, 3$^{rd}$ edition, 2011, Wiley, ISBN: 978-0-470-68227-2; Shen et al., *Expert Rev Proteomics.* 4(4):453-63, 2007). Spectral and spatial features can be used to provide a color coded image that resembles a stained image and its concordance with the control can be verified. An output computed stain image (such as one that is comparable to (e.g., provides the same information) one that would have been obtained if a stain interest, such as H&E stain or BRCA1 protein staining, was used) is generated from the entire or the reduced spectroscopic image. Upon training with appropriate control data/samples, the spectroscopic (e.g., IR) features and pattern recognition approach can be used together to predict the staining patterns in any new (e.g., test) sample.

In some examples, a control set of samples is analyzed to obtain a control or control database for relevant samples, to which the experimental or test sample is compared to. For example, a set of controls of the target sample (e.g., lung tissue) stained with a stain or dye of interest (e.g., H&E stain, Congo Red stain, or antibody specific for a target protein, that is directly or indirectly labeled (e.g., with a labeled secondary antibody)), can be used to generate or build an algorithm which is subsequently applied to the test sample. For example, if the test sample is lung tissue and the target stain is Congo Red, then control samples of known lung tissue stained with Congo Red can be analyzed as described herein (e.g., obtain spectroscopic image/data, optionally reduce spectroscopic image/data, and input into a network for training) to generate the algorithm to which an experimental lung sample is compared to generate an output computed Congo Red-like image. Thus, a plurality of samples stained with a target stain (such as H&E, Bismark Brown, Nile Blue or antibody specific for a target protein, that is directly or indirectly labeled, e.g., with a fluorophore or enzyme), which are the same sample type of interest (e.g., breast tissue, lung tissue, water sample) can be used to train a network. In one example, at least 10, at least 20, at least 50, at least 75, at least 100, at least 200, at least 500, or at least 1000 samples (such as 10-50, 10-100, 50-100 or 100-1000 samples) are used to train the network. Thus, if training using control samples is needed, prior to generating an output computed stain image for the test sample, the methods can include obtaining a spectroscopic image of the control-stained sample, optionally reducing the spectroscopic image (e.g., use the entire spectra or the reduced spectra), then imputing this information into a network, such as a neural network, support vector machine, or Bayesian classifier. The network relates the biochemical properties of the spectroscopic image/data to molecular or dye parameters, and transforms this to color values or staining intensity on each pixel. For example, a spectroscopic imaging data set is obtained for each training sample, thereby generating spectra (e.g., IR spectra) at every pixel. The dimensionality of the training spectroscopic imaging data set can be reduced, thereby generating a reduced spectroscopic imaging data set, which is inputted into a network for training. The resulting trained samples result in an algorithm and parameters for the network, which can be used to compare a test sample to, in order to generate an output image. The result of training is a set of parameters defining the neural network that can be applied to any unknown samples, to produce an output computed stain image without staining sample.

In some examples, the sample is analyzed ex situ, for example by using a sample removed from a subject, such as a sample removed during a surgical procedure (e.g., frozen section). For example, the disclosed methods can be used to ensure that clean margins are obtained after removing a tumor. In other examples, the sample is measured in vivo or in situ, for example while a patient is undergoing a medical procedure, such as a surgery to remove a tumor.

One or more steps of the method can be performed by a computer.

Figure 4:
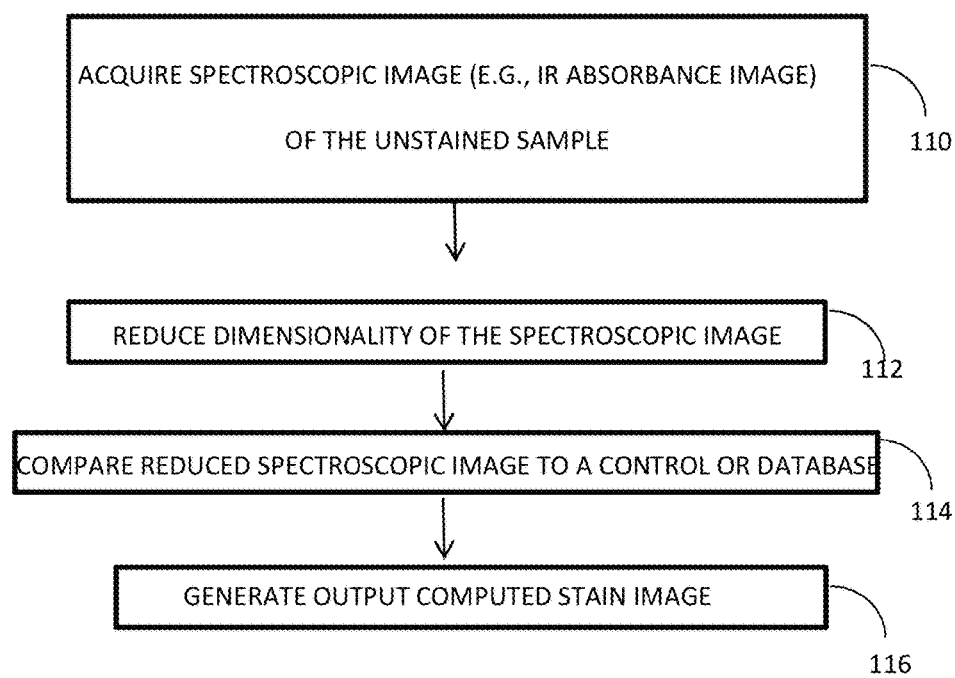
FIG. 4 provides an overview of the disclosed methods. The test sample is provided, and then and spectroscopic image (e.g., IR spectra) from the sample is obtained 110. The resulting spectroscopic image is analyzed to reduce its complexity 112. The reduced spectroscopic image (e.g., reduced IR spectra) is compared to a control database 114, and then an output compute stain image is generated 116.

FIG. 4 illustrates a method for analyzing sample, for example as a means to diagnose a disease. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed methods can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, IDL, Matlab, Adobe Flash, or any other suitable programming language. Likewise, the disclosed technology is not limited to any particular computer or type of hardware. Certain details of suitable computers and hardware are well known and are thus not be set forth in detail in this disclosure.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Turning to FIG. 4, in process block 110, a spectroscopic image (e.g., IR absorbance data) of an unstained sample (such as one containing a tumor or portion thereof) are acquired. For example, FT-IR images of a tissue sample can be taken directly, or obtained from another source. In process block 112, the dimensionality of the spectroscopic image or data (e.g., IR data) is reduced, for example using principal component analysis (PCA). The reduction process is used to reduce the amount of data used in subsequent steps, for example by eliminating regions in the sample that are not of interest. In process block 114, the reduced spectroscopic image or data is compared to a control or database analyzed by an algorithm, wherein the database includes a plurality of analyzed samples that were stained with the target stain or dye. In process block 116, an output computed stain image is generated. For example, the computed stain image can be comparable to an image obtained with the same tissue and stained with the target stain or dye.

Obtaining Spectroscopic Image

One skilled in the art will appreciate that the spectroscopic image can obtained using IR (such as mid-IR), Raman, fluorescence, lifetime terahertz or any other form of spectroscopy. For example, IR microscopes and/or Fourier transform infrared spectrometers can be used. Spectra may be obtained using a Fourier transform spectrometer, filters, lasers such as quantum cascade lasers or using any such spectral resolution device such as grating-based spectrometer. In one example, the spectroscopic image of the sample is obtained using spectroscopic imaging instrumentation, such as a mid-IR imaging system. IR light is light with a wavelength of about 750 nm to 1 mm. The mid-IR range is about 2 to 14 microns. The optical frequencies of the mid-IR region of the spectrum are in the range of molecular vibrational frequencies. Hence, if a molecular species is present, light is absorbed in a pattern consistent with its molecular constitution. The absorption spectrum can be used as a pattern of composition as well as metabolic activity. In one example, when obtaining the spectroscopic image, at least one mid-IR scan is obtained for each pixel in the image. For example, at least one spatial dimension (such as 1, 2 or 3 spatial dimensions) and at least one spectral (e.g., chemistry) dimension can be obtained, for example for each pixel in the image. In some examples, a 2-dimensional IR image is obtained, in other examples a 3-dimensional image is obtained.

Data Transformation

The resulting spectroscopic image and data (e.g., mid-IR images and spectra) can be analyzed to reduce the dimensionality of the spectral data obtained, for example using a computer program. The spectroscopic image and data can be filtered in some method examples to remove data that may be considered unreliable or unnecessary. It is understood that there are many methods known in the art for assessing such data. Methods of identifying and eliminating non-useful information from a dataset are known, and the disclosure is not limited to particular methods. Exemplary methods include pattern recognition algorithms such as principal component analysis (PCA) or a metrics approach. In some examples, spectral data may be excluded from analysis, in some cases, if it is not detected. For example, for each spectra and each pixel analyzed, there are about 2000 datapoints. To reduce the amount of data used in subsequent steps, regions not of interest in the sample can be eliminated, such as non-informative parts of the spectrum, pixels without information or without biological material, and the like. In one example, only pixels above a threshold absorption in the Amide I region of the spectrum (1650 $cm^{-1}$) are considered. Pixels with Amide I absorption below this threshold can be assumed empty and not considered in the analysis.

PCA is a mathematical method that uses an orthogonal transformation to convert a set of observations (here, a spectroscopic image and data, such as IR spectra) of possibly correlated variables into a set of values of linearly uncorrelated variables called principal components. Principal components are orthogonal information contained in the spectra. Thus, the information contained in one is not reproduced in another. Hence, they are a tool for reduction of data size. In the metrics approach, which is based on biochemical knowledge, human knowledge is used to describe spectroscopic (e.g., IR) features. As opposed to PCA method, which is automated, this method allows for use of prior human experiences (see for example Bhargava et al., *Biochim Biophys Acta*. 1758:830-845, 2006).

In some examples, portions of spectroscopic images or data (e.g., particular pixels or portions of the spectra) that exhibit no, or low variance may be excluded from further analysis. In one example, low-variance spectroscopic images or data are excluded from the analysis via a Chi- Square test. A portion of a spectroscopic image or data can be considered to be low-variance if its transformed variance is to the left of the 99 percent confidence interval of the Chi-Squared distribution with (N−1) degrees of freedom. In one example, spectroscopic images or data or a given stain or dye can be excluded from further analysis if they contain less than a minimum number of signals or a desired level of expression. In some examples, a statistical outlier program can be used that determines whether one of several replicates is statistically an outlier compared to the others, such as judged by being "x" standard deviations (SD) (e.g. at least 2-SD or at least 3-SD) away from the average, or CV % of replicates greater than a specified amount (e.g., at least 8% in log-transformed space). For example, an outlier could result from there being a problem with one of the pixels or due to an imaging artifact.

In some examples where spectroscopic images or data is measured in sample replicates (e.g., triplicates), reproducibility can be measured by pairwise correlation and by pairwise sample linear regression, and a correlation $r \geq 0.95$ used as acceptance of replicate (e.g., triplicate) reproducibility. In more specific examples, replicates with pairwise correlation $r \geq 0.90$ can be further reviewed by a simple regression model; in which case, if the intercept of the linear regression is statistically significantly different from zero, the replicate removed from further consideration. Any sample with more than 25% (e.g., 1 out of 4) or more, 33% (e.g., 1 out of 3) or more, 50% (e.g., 2 out of 4) or more, or 67% (e.g., 2 out of 3) or more failed replicates may be considered a "failed sample" and removed from further analysis.

Generating Computed Output Image

Once the spectroscopic image and data (e.g., mid-IR images and spectra) is reduced, it can be used to generate an output computed stain image (such as one that is comparable to the stain or target agent of interest, such as H&E stain or BRCA1 protein staining). The reduced spectroscopic image and data is input or applied to an algorithm that relates the detected spectral (e.g., IR) properties to dye parameters (such as a particular stain) or molecular parameters (such as a particular pathogen, cell, organelle, protein, or nucleic acid), and transforms this to color values or staining intensity on each pixel, or both. Thus, the reduced spectroscopic image and data can be compared to the parameters defining the network generated from control samples, which can then provide a color value for every pixel. The computed output image is simply the values plotted.

In some examples, the samples are also analyzed using light microscopy (brightfield image). In particular examples the method includes obtaining a brightfield optical image and a spectroscopic image from same unstained sample. The obtained data is combined with pattern recognition algorithms. The resulting refined data is input into a network that relates the biochemical properties to molecular or dye parameters, and transforms this to color values or staining intensity on each pixel. Predicted values of stain or dye are used to generate a computed stain image that is comparable to the target stain.

Multiplexing

In some examples, the method includes imaging a single sample multiple times, for example to obtain or generate a plurality of images using the method. The disclosed methods permit a single sample to be analyzed multiple times, as the methods do not result in substantial degradation or alteration of the sample. In contrast to traditional stains or dyes, which are usually not reversible or can result in degradation of the sample if it is treated with multiple stains or dyes, the current methods permit one to perform multiple analysis on a single sample, such as generating at least 2, at least 3, at least 4, at least 5, at least 6, at least 7, at least 8, at least 9, at least 10, at least 15, at least 20, at least 30, at least 40, at least 50, at least 75, or at least 100 or more different output computed stain images which are comparable to images that would be obtained using traditional stains or dyes. For example, a plurality of computed stain images for at least two different stains can be generated from a single sample, such as at least 3, at least 4, at least 5, at least 6, at least 7, at least 8, at least 9, at least 10, at least 15, at least 20, at least 30, at least 40, at least 50, at least 75, or at least 100 different stains (such as those provided herein). For example, a plurality of computed stain images for at least two different targets can be generated from a single sample, such as at least 3, at least 4, at least 5, at least 6, at least 7, at least 8, at least 9, at least 10, at least 15, at least 20, at least 30, at least 40, at least 50, at least 75, or at least 100 different proteins, different pathogens, different cells, or combinations thereof. In addition, a plurality of computed stain images for at least two different stains and for at least two different targets can be generated from a single sample, at least 5, at least 6, at least 7, at least 8, at least 9, at least 10, at least 15, at least 20, at least 30, at least 40, at least 50, at least 75, or at least 100 different stains and/or targets.

Samples

A sample can be any material to be analyzed by microscopy, such as biological samples and tissues, samples obtained from the environment or food, as well as non-biological samples, such as polymers and nanomaterials. For example, a polarized microscopy image could be obtained from a polymer sample without the use of polarizer. A sample can be biological or non-biological and can be obtained from a subject, an environment, a system, or a process. Thus, in some examples, the method includes obtaining the sample. For example, the sample can be obtained from a subject known or suspected of having a microbe infection, from a subject known or suspected of having a tumor (such as cancer), or from a source known or suspected of being contaminated by microbe.

In one example, the sample is excised or removed from the subject, and subsequently analyzed ex vivo. In another example, the sample is analyzed in vivo, for example while the subject is undergoing a medical procedure, such as surgery or a biopsy.

Biological samples obtained from a subject can include genomic DNA, RNA (including mRNA), protein, or combinations thereof. Examples include a tissue or tumor biopsy, fine needle aspirate, bronchoalveolar lavage, pleural fluid, spinal fluid, saliva, sputum, surgical specimen, lymph node fluid, ascites fluid, peripheral blood or fractions thereof (such as serum or plasma), urine, saliva, buccal swab, and autopsy material. Techniques for acquisition of such samples are well known in the art. Serum or other blood fractions can be prepared in the conventional manner. Samples can also include fermentation fluid and tissue culture fluid.

In one example the sample is obtained from a subject, such as a human subject. Such a sample can be any solid or fluid sample obtained from, excreted by or secreted by the subject, such as cells, cell lysates, peripheral blood (or a fraction thereof such as serum or plasma), urine, bile, ascites, saliva, cheek swabs, tissue biopsy (such as a tumor biopsy or lymph node biopsy), surgical specimen, bone marrow, amniocentesis samples, fine needle aspirates, cervical samples (for example a PAP smear, cells from exocervix, or endocervix), cerebrospinal fluid, aqueous or vitreous humor, a transudate, an exudate (for example, fluid obtained from an abscess or any other site of infection or inflammation), fluid obtained from a joint (for example, a normal joint or a joint affected by disease, such as a rheumatoid arthritis, osteoarthritis, gout or septic arthritis) and autopsy material.

In one example the sample is obtained from the environment, such as from a body of water, air, sediment, dust, soil, wood, plants or food or from the interior or surface of an animate or inanimate object in a natural or a residential, commercial, industrial, medical, academic, agricultural, or other man-made environment (e.g., food processing, production, and consumption facilities and disposal environments), and can be obtained from an industrial source, such as a farm, waste stream, or water source. Thus, samples can be those obtained from any environment known or suspected to harbor bacteria, microorganisms, or multicellular material generally.

In one example the sample is a food sample (such as a meat, fruit, dairy, or vegetable sample) or a sample obtained from a food-processing plant. For example, using the methods provided herein, adulterants in food products can be detected, such as a pathogen or toxin or other harmful product.

In some examples, the sample is a collected fluid, scraping, filtrand, or culture. In one example, the sample is a cytology sample.

Once a sample has been obtained, the sample can be used directly, concentrated (for example by centrifugation or filtration), purified, liquefied, diluted in a fluid, fixed (e.g., using formalin or heat) and/or embedded in wax (such as formalin-fixed paraffin-embedded (FFPE) samples), or combinations thereof. In some examples, the sample is not manipulated prior to its analysis, other than to apply it to a microscope slide or other solid support. In particular examples, samples are used directly (e.g., fresh or frozen). In one example, the sample is heat-fixed to a microscope slide or other solid support.

Samples may be fresh or processed post-collection (e.g., for archiving purposes). In some examples, processed samples may be fixed (e.g., formalin-fixed) and/or wax- (e.g., paraffin-) embedded. Fixatives for mounted cell and tissue preparations are well known in the art and include, without limitation, 95% alcoholic Bouin's fixative; 95% alcohol fixative; B5 fixative, Bouin's fixative, formalin fixative, Karnovsky's fixative (glutaraldehyde), Hartman's fixative, Hollande's fixative, Orth's solution (dichromate fixative), and Zenker's fixative (see, e.g., Carson, *Histotechology: A Self-Instructional Text*, Chicago: ASCP Press, 1997).

In some examples, the tissue sample (or a fraction thereof) is present on a solid support. Solid supports useful in disclosed methods need only bear the biological sample and, optionally, but advantageously, permit the convenient detection of components (e.g., stroma, epithelial cells) in the sample. Exemplary supports include microscope slides (e.g., glass microscope slides or plastic microscope slides), specialized IR reflecting or transmitting materials (e.g., $BaF_2$ slides or reflective slides), coverslips (e.g., glass coverslips or plastic coverslips), tissue culture dishes, multi-well plates, membranes (e.g., nitrocellulose or polyvinylidene fluoride (PVDF)) or BIACORE™ chips.

Control Samples and Obtaining Parameters for Network

The disclosed methods can include comparing the reduced spectroscopic image from unstained tissue (the test sample) to one or more control samples stained with the target stain or dye. For example, the control samples can be a plurality of samples stained and analyzed previously. These trained samples provide an algorithm and parameters for a network, which can be used to compare the test sample to, in order to generate an output image. In some examples, the algorithm obtained from the trained samples is already in hand. In other examples, it is generated as part of the method, for example by using statistical learning algorithms.

In one example, the control samples include a plurality of samples of the same type as the test sample. For example if the test sample is a breast sample, the control samples can also be breast samples, and if the test sample is a breast cancer sample, the control samples can also be breast cancer samples. Thus, the control sample can include, for example, normal tissue or cells, tissue or cells collected from a patient or patient population in which it is known that a benign tumor was present, or tissue or cells collected from a patient or patient population in which it is known that a particular cancer or infection was present. Similarly, the control sample can include an environmental or food sample containing the pathogen or spores of interest.

The control samples can include a plurality of samples that are stained with the target stain (in contrast to the test sample, which is not stained). For example if the output computer stain image desired is one that replicates an H&E image, the control samples are stained with H&E. For example if the output computer stain image desired is one that replicates Congo Red stained image, the control samples are stained with Congo Red. Similarly, if the output computer stain image desired is one that shows a target protein or cell, that is it replicates an image that results from staining the sample with an antibody specific for the target protein or cell, the control samples can stained with the antibody specific for the target protein or cell (for example by using an antibody that is directly or indirectly labeled).

If the algorithm and parameters for a network from the trained samples is available, it can be used to analyze the test sample to generate an output computed stain image. If the algorithm and parameters for a network from the trained samples is not available it can be generated from appropriately stained control samples, for example using statistical learning algorithms. The stained control samples are analyzed to obtain a spectroscopic image, which is optionally reduced. This information is applied to a network, such as a neural network, support vector machine, or Bayesian classifier, to produce an algorithm and parameters for the network needed to generate an output computed stain image for the test sample.

In some methods, the reduced spectroscopic image from the test sample is applied to an algorithm in order to generate the output computed stain image that is comparable to the stain or target of interest. A classifier is a predictive model (e.g., algorithm or set of rules) that can be used to classify test samples or portions thereof (e.g., pixels of a reduced spectroscopic image) into classes (or groups) (e.g., a particular staining intensity or color) based on the spectral properties detected in such samples. A classifier is trained on one or more sets of samples for which the desired class value(s) (e.g., staining pattern and/or intensity) is (are) known. Once trained, the classifier is used to assign class value(s) to future observations. Typical classification algorithms, include: Centroid Classifiers, k Nearest Neighbors (kNN), Bayesian Classification (e.g., Naïve Bayes and Bayesian Networks), Decision Trees, Neural Networks, Regression Models, Linear Discriminant Analysis, and Support Vector Machines.

Exemplary algorithms include, methods that handle large numbers of variables directly such as statistical methods and methods based on machine learning techniques. Statistical methods include penalized logistic regression, prediction analysis of microarrays (PAM), methods based on shrunken centroids, support vector machine analysis, and regularized linear discriminant analysis. Machine learning techniques include bagging procedures, boosting procedures, random forest algorithms, and combinations thereof.

In some embodiments, results are classified using a trained algorithm. Trained algorithms include algorithms that have been developed using a reference set of samples of the same type as the target sample (e.g., lung tissue) stained with a stain or dye of interest (e.g., H&E stain, Congo Red stain, or antibody specific for a target protein, that is directly or indirectly labeled (e.g., with a labeled secondary antibody)). Algorithms suitable for categorization of samples include, but are not limited to, k-nearest neighbor algorithms, concept vector algorithms, naive bayesian algorithms, neural network algorithms, hidden markov model algorithms, genetic algorithms, and mutual information feature selection algorithms or any combination thereof. In some cases, trained algorithms incorporate data other than staining data such as but not limited to diagnosis by cytologists or pathologists, information provided by a disclosed pre-classifier algorithm or gene set, or information about the medical history of a subject from whom a tested sample is taken.

In some specific embodiments, a support vector machine (SVM) algorithm, a random forest algorithm, or a combination thereof provides classification of samples or portions thereof (such as pixels) which permit generation of a computed output image. In some cases, a classifier algorithm may be supplemented with a meta-analysis approach such as that described by Fishel et al. (Bioinformatics, 23:1599 (2007)). In some cases, the classifier algorithm may be supplemented with a meta-analysis approach such as a repeatability analysis.

In some methods, the experimental values determined from the test sample are compared to a standard value or a control sample, such as a probability distribution function (pdf) value (or range of values) for reference or control samples. A standard value or range of can include, without limitation, the pdf value or range of values for metrics (such as spectral peak heights, ratios of peaks, peak areas and centers of gravity of the IR image, for example, a peak ratio of positions 1080:1456 cm$^{-1}$, 1556:1652 cm$^{-1}$, 1080:1238 cm$^{-1}$, and 1338:1080 cm$^{-1}$, a center of gravity of position 1216-1274 cm$^{-1}$, and a peak area of position 1426-1482 cm$^{-1}$) for stroma and for epithelium. A standard value or range of can include, without limitation, the pdf value or range of values for the spatial pattern of epithelium pixels for a target cell, protein, or stain. Such values can be obtained from a patient or patient population or other controls as described above.

Detection of Cellular Structures

In particular examples, at least one target to be detected by the disclosed methods is a cellular structure. Such structures are typically identified and localized in a sample using stains, such as H&E, iodine, methylene blue, Congo Red, carmine, toluidine blue, Sudan III, Wright's stain, acridine orange, Bismarck brown, acid fuchsine, and others listed herein. Exemplary non-limiting cellular structures that can be detected using the disclosed methods include carbohydrates, nucleus, nuclei, lumen, chromosomes, connective tissue, cytoskeleton, lipids, mucins, glycogen, and mitochondria, and collagen.

Detection of Cells

In particular examples, at least one target to be detected by the disclosed methods is a particular cell type. Such cells are typically identified and localized in a sample using stains or labeled antibodies. For example, target cells can be identified due to their expression of particular proteins, such as on the cell surface. Exemplary non-limiting cells that can be detected using the disclosed methods include tumor cells (for example by detecting tumor associated antigens as discussed below), epithelium, connective tissue, cardiac muscle cells, skeletal muscle cells, smooth muscle cells, neural cells, epidermal cells, stem cells, cells from particular organs such as a lung cells, pancreatic cells, thyroid cells, liver cells, plant cells, and the like.

Detection of Pathogens/Microbes

In particular examples, at least one target to be detected by the disclosed methods is a pathogen/microbe. Such pathogens are typically identified and localized in a sample using labeled antibodies, wherein the antibody is specific for a protein on the microbe. The disclosed methods can be used to determine if a sample contains one or more microbes, for example to determine if a subject is infected with a particular microbe, such as a bacterium, virus, fungi or protozoa.

Any pathogen or microbe can be detected using the methods provided herein. For example, microbes, as well as bacterial spores, can be detected. In some examples, a particular microbial cell is detected, or a particular virus. In some examples, intact microbes are detected, for example by detecting the cell wall composition of bacteria or the capsid composition of a virus.

Exemplary pathogens include, but are not limited to, viruses, bacteria, fungi, nematodes, and protozoa. A non-limiting list of pathogens that can be detected using the disclosed methods are provided below.

For example, viruses include positive-strand RNA viruses and negative-strand RNA viruses. Exemplary positive-strand RNA viruses include, but are not limited to: Picornaviruses (such as Aphthoviridae [for example foot-and-mouth-disease virus (FMDV)]), Cardioviridae; Enteroviridae (such as Coxsackie viruses, Echoviruses, Enteroviruses, and Polioviruses); Rhinoviridae (Rhinoviruses)); Hepataviridae (Hepatitis A viruses); Togaviruses (examples of which include rubella; alphaviruses (such as Western equine encephalitis virus, Eastern equine encephalitis virus, and Venezuelan equine encephalitis virus)); Flaviviruses (examples of which include Dengue virus, West Nile virus, and Japanese encephalitis virus); Calciviridae (which includes Norovirus and Sapovirus); and Coronaviruses (examples of which include SARS coronaviruses, such as the Urbani strain).

Exemplary negative-strand RNA viruses include, but are not limited to: Orthomyxyoviruses (such as the influenza virus), Rhabdoviruses (such as Rabies virus), and Paramyxoviruses (examples of which include measles virus, respiratory syncytial virus, and parainfluenza viruses).

Viruses also include DNA viruses. DNA viruses include, but are not limited to: Herpesviruses (such as Varicella-zoster virus, for example the Oka strain; cytomegalovirus; and Herpes simplex virus (HSV) types 1 and 2), Adenoviruses (such as Adenovirus type 1 and Adenovirus type 41), Poxviruses (such as Vaccinia virus), and Parvoviruses (such as Parvovirus B 19).

Another group of viruses includes Retroviruses. Examples of retroviruses include, but are not limited to: human immunodeficiency virus type 1 (HIV-1), such as subtype C; HIV-2; equine infectious anemia virus; feline immunodeficiency virus (FIV); feline leukemia viruses (FeLV); simian immunodeficiency virus (SIV); and avian sarcoma virus.

In one example, the virus detected with the disclosed methods is one or more of the following: HIV (for example an HIV antibody, p24 antigen, or HIV genome); Hepatitis A virus (for example an Hepatitis A antibody, or Hepatitis A viral genome); Hepatitis B (HB) virus (for example an HB core antibody, HB surface antibody, HB surface antigen, or HB viral genome); Hepatitis C(HC) virus (for example an HC antibody, or HC viral genome); Hepatitis D (HD) virus (for example an HD antibody, or HD viral genome); Hepatitis E virus (for example a Hepatitis E antibody, or HE viral genome); a respiratory virus (such as influenza A & B, respiratory syncytial virus, human parainfluenza virus, or human metapneumovirus), or West Nile Virus.

Pathogens also include bacteria. Bacteria can be classified as gram-negative or gram-positive. Examples of bacteria that can be detected with the disclosed methods, include without limitation: *Acinetobacter baumanii, Actinobacillus* sp., *Actinomycetes, Actinomyces* sp. (such as *Actinomyces israelii* and *Actinomyces naeslundii*), *Aeromonas* sp. (such as *Aeromonas hydrophila, Aeromonas veronii biovar sobria* (*Aeromonas sobria*), and *Aeromonas caviae*), *Anaplasma phagocytophilum, Alcaligenes xylosoxidans, Acinetobacter baumanii, Actinobacillus actinomycetemcomitans, Bacillus* sp. (such as *Bacillus anthracis, Bacillus cereus, Bacillus subtilis, Bacillus thuringiensis,* and *Bacillus stearothermophilus*), *Bacteroides* sp. (such as *Bacteroides fragilis*), *Bartonella* sp. (such as *Bartonella bacilliformis* and *Bartonella henselae, Bifidobacterium* sp., *Bordetella* sp. (such as *Bordetella pertussis, Bordetella parapertussis,* and *Bordetella bronchiseptica*), *Borrelia* sp. (such as *Borrelia recurrentis,* and *Borrelia burgdorferi*), *Brucella* sp. (such as *Brucella abortus, Brucella canis, Brucella melintensis* and *Brucella suis*), *Burkholderia* sp. (such as *Burkholderia pseudomallei* and *Burkholderia cepacia*), *Campylobacter* sp. (such as *Campylobacter jejuni, Campylobacter coli, Campylobacter lari* and *Campylobacter fetus*), *Capnocytophaga* sp., *Cardiobacterium hominis, Chlamydia trachomatis, Chlamydophila pneumoniae, Chlamydophila psittaci, Citrobacter* sp. *Coxiella burnetii, Corynebacterium* sp. (such as, *Corynebacterium diphtheriae, Corynebacterium jeikeum* and *Corynebacterium*), *Clostridium* sp. (such as *Clostridium perfringens, Clostridium difficile, Clostridium botulinum* and *Clostridium tetani*), *Eikenella corrodens, Enterobacter* sp. (such as *Enterobacter aerogenes, Enterobacter agglomerans, Enterobacter cloacae* and *Escherichia coli,* including opportunistic *Escherichia coli,* such as enterotoxigenic *E. coli,* enteroinvasive *E. coli,* enteropathogenic *E. coli,* enterohemorrhagic *E. coli,* enteroaggregative *E. coli* and uropathogenic *E. coli*) *Enterococcus* sp. (such as *Enterococcus faecalis* and *Enterococcus faecium*) *Ehrlichia* sp. (such as *Ehrlichia chafeensia* and *Ehrlichia canis*), *Erysipelothrix rhusiopathiae, Eubacterium* sp., *Francisella tularensis, Fusobacterium nucleatum, Gardnerella vaginalis, Gemella morbillorum, Haemophilus* sp. (such as *Haemophilus influenzae, Haemophilus ducreyi, Haemophilus aegyptius, Haemophilus parainfluenzae, Haemophilus haemolyticus* and *Haemophilus parahaemolyticus, Helicobacter* sp. (such as *Helicobacter pylori, Helicobacter cinaedi* and *Helicobacter fennelliae*), *Kingella kingii, Klebsiella* sp. (such as *Klebsiella pneumoniae, Klebsiella granulomatis* and *Klebsiella oxytoca*), *Lactobacillus* sp., *Listeria monocytogenes, Leptospira interrogans, Legionella pneumophila, Leptospira interrogans, Peptostreptococcus* sp., *Moraxella catarrhalis, Morganella* sp., *Mobiluncus* sp., *Micrococcus* sp., *Mycobacterium* sp. (such as *Mycobacterium leprae, Mycobacterium tuberculosis, Mycobacterium intracellulare, Mycobacterium avium, Mycobacterium bovis,* and *Mycobacterium marinum*), *Mycoplasm* sp. (such as *Mycoplasma pneumoniae, Mycoplasma hominis,* and *Mycoplasma genitalium*), *Nocardia* sp. (such as *Nocardia asteroides, Nocardia cyriacigeorgica* and *Nocardia brasiliensis*), *Neisseria* sp. (such as *Neisseria gonorrhoeae* and *Neisseria meningitidis*), *Pasteurella multocida, Plesiomonas shigelloides. Prevotella* sp., *Porphyromonas* sp., *Prevotella melaminogenica, Proteus* sp. (such as *Proteus vulgaris* and *Proteus mirabilis*), *Providencia* sp. (such as *Providencia alcalifaciens, Providencia rettgeri* and *Providencia stuartii*), *Pseudomonas aeruginosa, Propionibacterium acnes, Rhodococcus equi, Rickettsia* sp. (such as *Rickettsia rickettsii, Rickettsia akari* and *Rickettsia prowazekii, Orientia tsutsugamushi* (formerly: *Rickettsia tsutsugamushi*) and *Rickettsia typhi*), *Rhodococcus* sp., *Serratia marcescens, Stenotrophomonas maltophilia, Salmonella* sp. (such as *Salmonella enterica, Salmonella typhi, Salmonella paratyphi, Salmonella enteritidis, Salmonella cholerasuis* and *Salmonella typhimurium*), *Serratia* sp. (such as *Serratia marcesans* and *Serratia liquifaciens*), *Shigella* sp. (such as *Shigella dysenteriae, Shigella flexneri, Shigella boydii* and *Shigella sonnei*), *Staphylococcus* sp. (such as *Staphylococcus aureus, Staphylococcus epidermidis, Staphylococcus hemolyticus, Staphylococcus saprophyticus*), *Streptococcus* sp. (such as *Streptococcus pneumoniae* (for example chloramphenicol-resistant serotype 4 *Streptococcus pneumoniae*, spectinomycin-resistant serotype 6B *Streptococcus pneumoniae*, streptomycin-resistant serotype 9V *Streptococcus pneumoniae*, erythromycin-resistant serotype 14 *Streptococcus pneumoniae*, optochin-resistant serotype 14 *Streptococcus pneumoniae*, rifampicin-resistant serotype 18C *Streptococcus pneumoniae*, tetracycline-resistant serotype 19F *Streptococcus pneumoniae*, penicillin-resistant serotype 19F *Streptococcus pneumoniae*, and trimethoprim-resistant serotype 23F *Streptococcus pneumoniae*, chloramphenicol-resistant serotype 4 *Streptococcus pneumoniae*, spectinomycin-resistant serotype 6B *Streptococcus pneumoniae*, streptomycin-resistant serotype 9V *Streptococcus pneumoniae*, optochin-resistant serotype 14 *Streptococcus pneumoniae*, rifampicin-resistant serotype 18C *Streptococcus pneumoniae*, penicillin-resistant serotype 19F *Streptococcus pneumoniae*, or trimethoprim-resistant serotype 23F *Streptococcus pneumoniae*), *Streptococcus agalactiae, Streptococcus mutans, Streptococcus pyogenes,* Group A streptococci, *Streptococcus pyogenes,* Group B streptococci, *Streptococcus agalactiae,* Group C streptococci, *Streptococcus anginosus, Streptococcus equismilis,* Group D streptococci, *Streptococcus bovis,* Group F streptococci, and *Streptococcus anginosus* Group G streptococci), *Spirillum minus, Streptobacillus moniliformi, Treponema* sp. (such as *Treponema carateum, Treponema petenue, Treponema pallidum* and *Treponema endemicum, Tropheryma whippelii, Ureaplasma urealyticum, Veillonella* sp., *Vibrio* sp. (such as *Vibrio cholerae, Vibrio parahemolyticus, Vibrio vulnificus, Vibrio parahaemolyticus, Vibrio vulnificus, Vibrio alginolyticus, Vibrio mimicus, Vibrio hollisae, Vibrio fluvialis, Vibrio metchnikovii, Vibrio damsela* and *Vibrio furnisii*), *Yersinia* sp. (such as *Yersinia enterocolitica, Yersinia pestis,* and *Yersinia pseudotuberculosis*) and *Xanthomonas maltophilia* among others.

Protozoa, nemotodes, and fungi are also types of pathogens. Exemplary protozoa include, but are not limited to, *Plasmodium* (e.g., *Plasmodium falciparum* to diagnose malaria), *Leishmania, Acanthamoeba, Giardia, Entamoeba, Cryptosporidium, Isospora, Balantidium, Trichomonas, Trypanosoma* (e.g., *Trypanosoma brucei*), *Naegleria,* and *Toxoplasma*. Exemplary fungi include, but are not limited to, *Coccidiodes immitis* and *Blastomyces dermatitidis*.

In one example, bacterial spores are detected. For example, the genus of *Bacillus* and *Clostridium* bacteria produce spores that can be detected. Thus, *C. botulinum, C. perfringens, B. cereus,* and *B. anthracis* spores can be detected (for example detecting anthrax spores). One will also recognize that spores from green plants can also be detected using the methods provided herein.

Detection of Tumors

In particular examples, at least one target to be detected by the disclosed methods is a protein, such as a unique cell identified, functional protein expression or tumor-associated antigen. Such proteins are typically identified and localized in a sample using labeled antibodies. Tumor-associated antigens are antigens differentially expressed by tumor cells, typically in significantly greater amounts, than usually found on a normal cell or tissue. Elevated levels of these antigens can be used as tumor markers, for example for diagnosis of a particular cancer.

Thus, in one example, the methods permit detection of one or more tumor-associated or tumor-specific antigens, without the use of stains or antibodies (such as directly or indirectly labeled antibodies). Exemplary tumor-associated antigens include but are not limited to CA-125 (ovarian cancer marker), alphafetoprotein (AFP, liver cancer); immature laminin receptor and 9D7 (renal cell carcinoma) carcinoembryonic antigen (CEA) and SAP-1 (colorectal cancer); BRCA1 and 2 (breast and ovarian cancer), TAG-72 (prostate cancer); complement factor H related protein (CFHrp; bladder cancer); mesothelin (pancreatic cancer); melanoma-associated antigen (MAGE), and the like. BING-4 (melanoma); calcium-activated chloride channel 2 (lung carcinoma); cyclin-B1 (many cancers); Ep-CAM (breast carcinoma); EphA3 (many cancers); telomerase (many cancers); p53 (many cancers); Ras (many cancers); BRAF (many cancers); and survivin (many cancers).

In another example, the tumor antigen is an oncoviral antigen, such as HPV E6 and E7 (cervical cancer).

Also see, Tumor-Associated Antigens. Edited by Olivier Gires and Barbara Seliger, Part One Tumor-associated Antigens (TAAs): Subclasses of TAAs. Copyright 2009, herein incorporated by reference.

Outputs

In some embodiments, once a sample is analyzed, an indication of that analysis can be displayed and/or conveyed to a clinician or other caregiver. For example, the results of the test can be provided to a user (such as a clinician or other health care worker, laboratory personnel, or patient) in a perceivable output that provides information about the results of the test. In some embodiments, the output is a paper output (for example, a written or printed output), a display on a screen, a graphical output (for example, a graph, chart, voltammetric trace, or other diagram), or an audible output. For example, the computed stain image can be outputted, for example in a visual form, such as in color.

In other embodiments, the output is a diagnosis, such as whether the sample analyzed is cancerous or benign, whether the sample contains the target cell, protein or nucleic acid molecule (such as increased expression of such targets), or whether the sample is infected with the pathogen of interest. In additional embodiments, the output is a graphical representation, for example, a graph that indicates the value (such as amount or relative amount) of the likelihood that the sample is cancerous or benign, likelihood that the sample contains the target protein or nucleic acid molecule (such as the likelihood of increased or decreased expression of such targets), or likelihood that the sample contains the target pathogen. In some examples, the output is a number on a screen/digital display, such as one indicating the probability of the sample being cancer or benign, probability of the sample containing the target protein or nucleic acid molecule (such as the probability of increased or decreased expression of such targets), or probability that the sample contains the target pathogen. In some examples, the output is text, indicating the likelihood that the sample is cancerous or benign, likelihood that the sample contains the target protein or nucleic acid molecule (such as the likelihood of increased or decreased expression of such targets), or likelihood that the sample contains the target pathogen, for example along with the corresponding implications to the patient if appropriate. Sensitivity, specificity, and confidence intervals may also be a part of the output. These outputs can be in the form of graphs or tabulated numbers. The output can be a color-coded image with different colors indicating different probabilities of being cancer or normal, probabilities that the sample contains the target protein or nucleic acid molecule (such as the likelihood of increased or decreased expression of such targets), or probabilities that the sample contains the target pathogen. In some embodiments, the output is communicated to the user, for example by providing an output via physical, audible, or electronic means (for example by mail, telephone, facsimile transmission, email, or communication to an electronic medical record).

In some embodiments, the output is accompanied by guidelines for interpreting the data, for example, numerical or other limits that indicate whether the test sample is cancerous or benign, whether the sample contains the target protein or nucleic acid molecule (such as whether there is increased or decreased expression of such targets), or whether the sample contains the target pathogen. The guidelines need not specify whether the test sample is cancerous or benign, whether the sample contains the target protein or nucleic acid molecule (such as whether there is increased or decreased expression of such targets), or whether the sample contains the target pathogen although it may include such a diagnosis. The indicia in the output can, for example, include normal or abnormal ranges or a cutoff, which the recipient of the output may then use to interpret the results, for example, to arrive at a diagnosis, prognosis, or treatment plan. In other embodiments, the output can provide a recommended therapeutic regimen. In some embodiments, the test may include determination of other clinical information (such as determining the amount of one or more additional biomarkers in the biological sample).

In particular examples, the methods provided herein have a sensitivity of at least 90%, at least 95%, at least 98%, at least 97%, or at least 99% sensitivity, wherein sensitivity is the probability that a statistical test will be positive for a true statistic. In particular examples, the methods provided herein have a specificity of at least 70%, at least 75%, at least 80%, at least 82%, at least 85% or at least 90% specificity, wherein specificity is the probability that a statistical test will be negative for a negative statistic.

Methods of Treatment

The disclosed methods can further include identifying and/or selecting subjects for treatment based on the results of imaging the unstained sample. Methods and therapeutic dosages of therapeutic agents are known to those skilled in the art, and can be determined by a skilled clinician.

For example, if the analysis indicates that the sample is positive for cancer cells or proteins, the subject can be treated with (e.g., administered) a therapeutically effective amount of an appropriate chemotherapy and/or biotherapy (e.g., antibodies specific for the tumor). Chemotherapies and biotherapies include therapeutic agents that when administered in therapeutically effective amounts induce the desired response (e.g., treatment of a cancer, for example by reducing the size or volume of the tumor, or reducing the size, volume or number of metastases). Examples of chemotherapies and bio-therapies include but are not limited to antineoplastic chemotherapeutic agents, antibiotics, alkylating agents and antioxidants, kinase inhibitors, and other agents such as antibodies. Particular examples of chemotherapeutic and biotherapeutic agents that can be used include alkylating agents, such as nitrogen mustards (for example, chlorambucil, chlormethine, cyclophosphamide, ifosfamide, and melphalan), nitrosoureas (for example, carmustine, fotemustine, lomustine, and streptozocin), platinum compounds (for example, carboplatin, cisplatin, oxaliplatin, and BBR3464), busulfan, dacarbazine, mechlorethamine, procarbazine, temozolomide, thiotepa, and uramustine; folic acid (for example, methotrexate, pemetrexed, and raltitrexed), purine (for example, cladribine, clofarabine, fludarabine, mercaptopurine, and tioguanine), pyrimidine (for example, capecitabine), cytarabine, fluorouracil, and gemcitabine; plant alkaloids, such as podophyllum (for example, etoposide, and teniposide); microtubule binding agents (such as paclitaxel, docetaxel, vinblastine, vindesine, vinorelbine (navelbine) vincristine, the epothilones, colchicine, dolastatin 15, nocodazole, podophyllotoxin, rhizoxin, and derivatives and analogs thereof), DNA intercalators or cross-linkers (such as cisplatin, carboplatin, oxaliplatin, mitomycins, such as mitomycin C, bleomycin, chlorambucil, cyclophosphamide, and derivatives and analogs thereof), DNA synthesis inhibitors (such as methotrexate, 5-fluoro-5'-deoxyuridine, 5-fluorouracil and analogs thereof); anthracycline family members (for example, daunorubicin, doxorubicin, epirubicin, idarubicin, mitoxantrone, and valrubicin); antimetabolites, such as cytotoxic/antitumor antibiotics, bleomycin, rifampicin, hydroxyurea, and mitomycin; topoisomerase inhibitors, such as topotecan and irinotecan; monoclonal antibodies, such as alemtuzumab, bevacizumab, cetuximab, gemtuzumab, rituximab, panitumumab, pertuzumab, and trastuzumab; photosensitizers, such as aminolevulinic acid, methyl aminolevulinate, porfimer sodium, and verteporfin, enzymes, enzyme inhibitors (such as camptothecin, etoposide, formestane, trichostatin and derivatives and analogs thereof), kinase inhibitors (such as imatinib, gefitinib, and erolitinib), gene regulators (such as raloxifene, 5-azacytidine, 5-aza-2'-deoxycytidine, tamoxifen, 4-hydroxytamoxifen, mifepristone and derivatives and analogs thereof); and other agents, such as alitretinoin, altretamine, amsacrine, anagrelide, arsenic trioxide, asparaginase, axitinib, bexarotene, bevacizumab, bortezomib, celecoxib, denileukin diftitox, estramustine, hydroxycarbamide, lapatinib, pazopanib, pentostatin, masoprocol, mitotane, pegaspargase, tamoxifen, sorafenib, sunitinib, vemurafinib, vandetanib, and tretinoin. Other therapeutic agents, for example anti-tumor agents, that may or may not fall under one or more of the classifications above, also are suitable for administration in combination with the described specific binding agents.

In another example, if the analysis indicates that the sample is positive for a particular microbe, then the subject can be treated with a therapeutically effective amount of an appropriate antimicrobial, such as one or more antiviral agents (e.g., oseltamivir, acyclovir, valaciclovir, abacavir, etc.), antibacterial agents (e.g., penicillin, amoxicillin, gentamicin, ciprofloxacin, levofloxacin, etc.), anti-fungal agents (e.g., benzimidazole fungicides, conazole fungicides, imidazole fungicides etc.), antiparasitic agents (e.g., niclosamide, tiabendazole, rifampin, melarsoprol, tinidazole, etc.), and the like.

Therapeutic agents can be administered to a subject in need of treatment using any suitable means known in the art. Methods of administration include, but are not limited to, intradermal, transdermal, intramuscular, intraperitoneal, parenteral, intravenous, subcutaneous, vaginal, rectal, intranasal, inhalation, oral, or by gene gun. Intranasal administration refers to delivery of the compositions into the nose and nasal passages through one or both of the nares and can include delivery by a spraying.

Computer-Readable Media

Also provided herein are computer-readable storage medium having instructions thereon for performing a method of analyzing a sample, for example to diagnose the sample as a particular cancer type or as being infected with a particular pathogen. Thus, computer-readable storage medium having instructions thereon for performing the methods described herein are disclosed.

Any of the computer-readable media herein can be non-transitory (e.g., memory, magnetic storage, optical storage, or the like).

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Any of the methods described herein can be implemented by computer-executable instructions stored in one or more computer-readable storage devices (e.g., memory, magnetic storage, optical storage, or the like). Such instructions can cause a computer to perform the method.

Systems for Stain-Free Imaging

The present disclosure provides systems for imaging an unstained sample. for example, such a system can include a means for obtaining a spectroscopic image of the unstained sample, implemented rules for reducing dimensionality of the spectroscopic image, implemented rules for comparing the reduced spectroscopic image to a control image, and means for implementing the rules, thereby generating an output computed stain image from the reduced spectroscopic image and imaging the unstained sample. In some examples the rules include computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices or tablets that include computing hardware).

Exemplary means for obtaining a spectroscopic image of the unstained sample are known in the art, and the disclosure is not limited to particular imaging systems. In one example, the means for obtaining a spectroscopic image of the unstained sample is a means for spectroscopy, for example IR (such as mid-IR), Raman, fluorescence, lifetime terahertz or any other form of spectroscopy. For example, spectra may be obtained using a Fourier transform spectrometer, filters, lasers such as quantum cascade lasers or using any such spectral resolution device such as grating-based spectrometer. In one example, the spectroscopic image of the sample is obtained using spectroscopic imaging instrumentation, such as IR spectroscopic imaging instrumentation (e.g., a mid-IR imaging system) or a Fourier Transform IR imaging system, such as one that includes an IR or Fourier transform infrared spectrometer. For example, IR microscopes and/or Fourier transform infrared spectrometers or those using lasers or gratings for spectroscopy can be used for the means.

In some examples, the system also includes means to process the obtained spectral data from the sample, such as a computer and software to remove background absorbance and to baseline correct each pixel. In some examples, the system further includes means to computationally reduce noise, to deconvolve the image, or both (such as an appropriately programmed computer).

The system can include implemented rules for reducing dimensionality of the spectroscopic image. Exemplary rules for reducing dimensionality of the spectroscopic image are known in the art, and the disclosure is not limited to particular rules. Such rules can filter in some examples to remove data from the spectroscopic image generated that may be considered unreliable or unnecessary. In some examples, spectral data may be excluded from analysis, in some cases, if it is not detected. For example, the rule can eliminate regions not of interest in the sample, such as non-informative parts of the spectrum, pixels without information or without biological material, and the like. In one example, only pixels above a threshold absorption in the Amide I region of the spectrum (1650 $cm^{-1}$) are considered. Pixels with Amide I absorption below this threshold can be assumed empty by the rule and not considered in the analysis. Exemplary rules that can be used to reduce the dimensionality of the spectroscopic image include pattern recognition algorithms, such as principal component analysis (PCA) or a metrics approach.

The system can include implemented rules for comparing the reduced spectroscopic image to a control image (or plurality of images), such as those that may be stored in a database. Exemplary rules for comparing the reduced spectroscopic image to a control image are known in the art, and the disclosure is not limited to particular rules. Such rules can relate the detected spectral (e.g., IR) properties to dye parameters (such as a particular stain) or molecular parameters (such as a particular pathogen, cell, organelle, protein, or nucleic acid), and transform this to color values or staining intensity on each pixel, or both. For example, the rule can compare the parameters defining the network generated from control samples (such as those stored in a database), which can then provide a color value for every pixel. The absorbance values of specific spectral bands may also be directly related to the concentration of a dye or probe. Algorithms for comparisons are routine in the art (e.g., statistical recognition methods)

The system can include means for implementing the rules. For example, the means can generate an output computed state image by plotting the values. Thus, an output computed stain image is generated from the reduced spectroscopic image and imaging the unstained sample. Such exemplary means include a computer or network.

In some examples, the system further includes a means for obtaining a brightfield image of the unstained sample, such as a light microscope means. In some examples, the system further includes means for inputting data (such as a reduced spectroscopic image) into a network that relates the biochemical properties to molecular or dye parameters, and rules that transform this to color values or staining intensity on each pixel. Examples of such means include keyboards and software. Predicted values of stain or dye are used to generate a computed stain image that is comparable to the target stain.

EXAMPLE 1

Materials and Methods

This example provides the materials and methods used in Examples 2-4 below. Although the examples describe studies using breast tissue, one skilled in the art will appreciate that other tissues and samples can be used based on the teachings provided herein.

The problem of spectral unmixing in breast tissue was solved herein by mapping the infrared images to bright-field images representing an array of common histological stains. Several tissue samples representing a broad panel of normal tissue, non-malignant and cancer subtypes, including tissue microarrays and surgical resections of breast biopsies, were used. A training set was constructed by first imaging the tissue using mid-infrared spectroscopy. Adjacent sections were then stained using a panel of standard and immunohistochemical stains and imaged using bright-field microscopy. The bright-field images were then adjusted to overlay the spectroscopic images. This created a spatial (pixel-to-pixel) map to the IR data, from corresponding spectrum/RGB pairs were can extracted. A principal component analysis (PCA) was used to reduce the dimensionality of the input spectra and train a feed-forward neural network using the PCA-projected spectra as input and the associated bright-field color data as output. The high data rate provided by IR spectroscopic imaging combined with the large number of tissue samples used provided millions of spectrum-RGB pairs for each stain.

Tissue Microarrays

Tissue microarrays (TMAs) representing normal breast tissue, pre-cancer, non-malignant, and malignant breast cancer were acquired from the cooperative human tissue network via the Tissue array research program, NCI and from US Biomax (Rockville, Md.). TMAs are useful for analyzing large patient sets and to encounter a wide variety of cell types and disease states to ensure robust classifiers (Camp et al., *Lab Invest* 80:1943-9, 2000). The training and validation sample data sets consisted of 1.5 mm diameter needle core biopsies of at least 100 samples each. One section was placed on an IR transparent substrate, barium fluoride ($BaF_2$), for IR spectroscopic imaging while serial sections were placed on glass slides and stained with H&E, Masson's trichrome, and a panel of IHC stains commonly used for breast cancer. This system is used for routine clinical samples.

The tissues on $BaF_2$ had their paraffin removed by emersion in hexane at 40° C. for 48 hrs. IR imaging was performed in transmission-mode using a Perkin Elmer Spotlight 400 Fourier Transform IR Imaging system in transmission mode at 6.25 μm spatial resolution and 4 $cm^{-1}$ spectral resolution from 750 $cm^{-1}$ to 4000 $cm^{-1}$. Spectral data was processed to remove background absorbance and each pixel was independently baseline corrected.

Stained sections were imaged using a Hamamatsu Nano-Zoomer 2.0 series scanner with 20× objective (0.46 μm/pixel). Bright-field images were filtered and downsampled to match the resolution of the IR image and individual cores were manually aligned to construct the training set. Since the infrared and bright-field images were from adjacent sections, cell-level alignment was not possible. To compensate for shifted positions in high-frequency features, a Gaussian blur with 5-pixel standard deviation was applied to the bright-field image.

Surgical Resections

Formalin-fixed paraffin-embedded (FFPE) surgical specimens were sectioned and placed on MirrIR low-e microscope slides (Kevley Technologies) and imaged using a Perkin Elmer Spotlight 400 Fourier Transform IR Imaging system in reflection mode at 6.25 µm spatial resolution and 8 $cm^{-1}$ spectral resolution from 750 $cm^{-1}$ to 4000 $cm^{-1}$. Spectral data was processed to remove background absorbance and each pixel was independently baseline corrected. The sections were then stained with H&E or Masson's trichrome. Stained sections were then imaged using a Zeiss Axiovert 200M Microscope with a 2.5× Plan-Neofluar objective and Zeiss AxioCam MRm color camera (2.39 µm/pixel). The bright-field images were then filtered and resampled to match the resolution of the IR spectroscopic images. Since the same tissue was imaged in both IR and bright-field, an affine transformation was then applied to bring all pixels into alignment. Transformation and alignment was performed using the GNU Image Manipulation Program (GIMP).

Tissue Preparation

Tissue samples were collected from anonymized, formalin-fixed, paraffin embedded breast biopsies taken with 0.6 mm and 1.6 mm needles. Clinical samples were obtained and prepared for infrared imaging were placed on low-emissivity MirrIR coated glass slides from Kevley Technologies. Neighboring sections were placed on standard glass slides and stained using a BioGenex i6000 Automated Staining System.

Imaging

Unstained sections placed on low-emissivity glass were imaged using a Perkin-Elmer Spotlight 300 Mid-Infrared imaging system with a 16-element linear array detector. Imaging was performed in reflection mode at 4 $cm^{-1}$ spectral resolution using a 15×, 0.5 NA objective, providing a spatial resolution of 6.25 µm. After imaging, the sections were stained and imaged using a Zeiss Axiovert 200M fluorescence light microscope with a 2× Plan-Neofluar 0.3NA objective providing a spatial resolution of 1 µm. Color images were collected using an Axiocam HRC color CCD camera. Neighboring histological sections used for qualitative validation were imaged using a Hamamatsu NanoZoomer.

Neural Network Training and Simulation

A mapping from principal components (spectral metrics) to RGB color values was created using a neural network regression model. A 2-layer feed-forward neural network was constructed. The output layer uses a linear transfer function and the input layer uses a nonlinear sigmoid ($tan^{-1}$) transfer function. The number of input nodes and internal nodes is specified by the user. The number of input nodes corresponds to the number of principal components (metrics) used in the regression. Increasing these values generally reduces error on the training data but can reduce performance during validation. The spectra/RGB mapping of the training data provides a large number of training samples (several million spectra), which permits an increase in the number of spectral features while enforcing model generality and minimizing over-fitting. The resulting reduction in general performance is a form of over-fitting, and minimizing the resulting generalization error is common practice in ANN training. The use of PCA in addition to a large number of training spectra can be used to improve ANN performance. Since the training data set is well represented using a small number of principal components, the sample space for these parameters is relatively small. For each stain, the most robust combination of input and internal nodes was identified by searching this parameter space for the best performance on an independent validation set.

For each stain a tissue array is sampled by constructing a training set of 600,000 to 2 million spectrum/RGB pairs. This set is divided into two groups: 75% training and 25% validation. Training was performed using Levenberg-Marquardt minimization based on the training set while the validation set was repeatedly checked to limit over-training. If the mean-squared error of the validation set began to increase, training was terminated. Several neural networks were trained, adjusting the number of principal components and internal nodes. The second independent validation set is simulated on each network and the resulting mean squared error (MSE) is computed. The optimal network topology is selected by minimizing MSE performance.

For each stain, a slice of the data cube taken at the Amide-I peak (1650 $cm^{-1}$) was taken and saved as a single two-dimensional image. Individual cores from the optical microscopy images were aligned to the Amide-I mosaic and resampled to match the resolution of the IR image. Since both tissue samples were identical, only affine transformations were necessary to achieve alignment between the IR and brightfield images.

In one examples of the method, IR spectra were then baseline corrected and normalized to Amide-I. The Amide-I value was stored for later use in training. All spectra in a single training array were then used to compute the mean spectrum mu and the principal component basis P. The 10 largest principal components of the correlation matrix accounted for over 99% of the variance in the data set. These 10 components were used as input values for a neural network. For stains that depended on tissue density for color, such as H&E and Masson's Trichrome, the original Amide-I peak value taken before normalization (after baseline correction) was also used as an input feature.

For each stain, 1M sample spectra were randomly selected across 80 cores. These samples, along with their corresponding brightfield color values, were used to fit the following nonlinear neural network model:

$$W_1^T \tan h[W_0^T[P^T(\bar{s}-\bar{\mu})]+\bar{b}_0]+\bar{b}_1 = \bar{C}_0$$

where the hyperbolic tangent is an element-wise operation on the vector $\bar{x}$:

$$\tanh \bar{x} = \begin{bmatrix} \tanh(x_0) \\ \tanh(x_1) \\ \tanh(x_2) \\ \vdots \\ \tanh(x_n) \end{bmatrix}$$

This equation represents a neural network with a single hidden layer and three output values corresponding to the color values of the matching brightfield image. The tensors W and $\bar{b}$ contain the weight and bias values for the hidden (0) and output (1) layers. The matrix P is the principal component basis and $\bar{\mu}$ is the mean spectrum. 151 spectral metrics were used as input features ($W_0=[151\times10]$).

The weight and bias values were computed using Levenberg-Marquardt (LM) backpropagation, which is an iterative nonlinear fitting algorithm with a dynamic step size. The mean-squared error (MSE) between the computed output values and the corresponding brightfield color values was used as a performance metric for LM minimization. Over fitting was minimized by using 25% of the original training pairs as a validation set. The validation set was simulated after each iteration of LM. If the MSE of this validation set began to diverge, training was terminated. Qualitative validation was performed using cores independent from the training set.

Principal Component Analysis

Principal component analysis (PCA) was used to reduce the dimensionality of the spectral data. The PCA transform was computed based on over 8 million point spectra across a tissue microarray and surgical resection. Only pixels above a threshold absorption in the Amide I region of the spectrum (1650 $cm^{-1}$) were considered. Pixels with Amide I absorption below this threshold were assumed empty and not considered in training or validation.

Since the first seven principal components represent over 99% of the variance in the data, this optimization allows for dramatic reduction in the amount of memory and time required to train the neural network. In addition, this reduces the parameter space required for regression, allowing a more robust mapping from point spectra to bright-field. In the next section, the method for finding the optimal number of components for each stain is discussed.

Bayesian Classification for Cell Type Identification

An 8-class modified Bayesian classifier was built in the same fashion as previously shown in prostate tissue (see Fernandez et al., *Nature Biotechnol.*, 23, 469-474, 2005). Using the staining information, pixels corresponding to epithelial cells, fibroblasts, collagen-rich stroma, lymphocytes, myofibroblasts, blood, necrosis, and mucin were identified. A training array consisting of 6 normal, 12 hyperplasia, 6 benign and 8 in-situ and 36 cases of breast cancer had over 400,000 pixels identified for the eight cell types. Average spectra were derived to identify key chemical differences between cell types. A total of 33 spectral metrics were found to be optimal for classification. Validation of the classifier was performed on at least 100 samples of each type.

EXAMPLE 2

Comparison of H&E Stained Image to Computed Stain Image

Breast tissue previously fixed and paraffin embedded, was stained with H&E, and imaged using microscopy before and after staining with H&E. As shown in FIG. 1A, brightfield optical image of tissue has little contrast. Conventionally, the use of H&E stain allows a visualization of tissue morphology using optical microscopy (FIG. 1B).

The same unstained tissue shown in FIG. 1A was subjected to IR spectroscopic imaging in the form of two spatial dimensions and a spectral dimension (FIG. 1C). The spectrum at every pixel contains specific features that are indicative of the molecular content of the sample as well as its optical properties (Davis et al., *Anal. Chem.* 82:3474-86, 2010).

The size of the data is then reduced from either knowledge of biochemical absorption or a statistically-based dimensionality reduction approaches. This produces a data set containing a significantly smaller number of spectral features that capture important variations in tissue chemistry. These features are then used as input for statistical pattern recognition algorithms (Bhargava, *Anal Bioanal. Chem.* 389:1155-69, 2007).

Two methods for data reduction were examined. One based on biochemical knowledge (metrics approach) (Bhargava et al., *Biochim Biophys Acta.* 1758, 830-845, 2006) and another based on statistical terms (principal component analysis). Both approaches provided equivalent results and results using the metric approach are presented herein, since the corresponding features are firmly based in tissue biochemistry.

The reduced data set formed an input to a neural network (NN) model (Haykin, S. S. *Neural networks: a comprehensive foundation*, Prentice Hall, 2007) that relates the biochemical input to molecular or dye parameters. The NN transformed the recorded spectroscopic data at every pixel into color values or staining intensity found in histological stains imaged using bright-field microscopy (FIG. 1D). Finally, the predicted stain or dye values were used to generate a computed stain image (FIG. 1E). By comparing FIG. 1B (the H&E image) with FIG. 1E (computed stain image), it is shown that the computed stain image faithfully reproduces the staining pattern of H&E images that are important for recognition.

EXAMPLE 3

Comparison of Tissue-Specific Stained Images to Computed Stain Images

H&E stains are fairly non-specific in terms of the functional or molecular content of the tissue. Visualizing molecular content is significantly more expensive, time-consuming and difficult; yet, this is precisely the origin of the contrast mechanism in chemical imaging. Hence, additional stains were examined that are indicative of tissue function and integrity. Immunohistochemical (IHC) stains for cell types are often used in diagnostic imaging or for specific research purposes, for example, high molecular weight (HMW) cytokeratin (epithelial-type cells), vimentin (fibroblast-like cells), smooth muscle alpha actin (myo-like cells), P63 (myoepithelial cells), CD31 (endothelial cells) and Masson's Trichrome stain (collagen and keratin fibers), are commonly employed.

A comparison of the physically stained and computationally stained images is shown in FIGS. 2A-2E. Since the process is correlative, during training and validation, high throughput tissue microarrays (Kononen et al., *Nat Med* 4: 844-7, 1998) were used in which histopathologic, clinical and patient diversity is built-in. Depending on the stain type and cellular abundance, the model was trained on 600,000 to 2 million spectra from 96 patients and the approach validate=d in an independent set of 98 patients. As shown in FIGS. 2A-2E, the computationally stained images (the three images on the right) provide an accurate and reliable alternative to the use of images obtained from physically stained tissues (the three images on the left).

EXAMPLE 4

Multiplexing Computed Stain Images

Using a combination of multiple staining results, it is possible to subsequently deduce the cell types and/or molecular transformations present. However, in some cases, material is limited, thus limiting the amount of stains that can be used on any one sample. In contrast, the chemical content in spectroscopy, recorded once, can be used multiple times to relate to expression levels in tissue. Hence, the method allows numerous (perhaps limitless) computed stains to be obtained from a single infrared spectroscopic image for the same sample. Such a capability is useful when the tissue available is limited, e.g. in fine needle biopsies or spheroids in 3D cell culture. In addition, this capability provides a quantitative method for histology, reducing or eliminating staining variance between samples and providing a means of quickly extracting a large range of histological information from a single tissue sample.

Figures 3A, 3B, 3C, 3D, 3E, 3F, 3G:
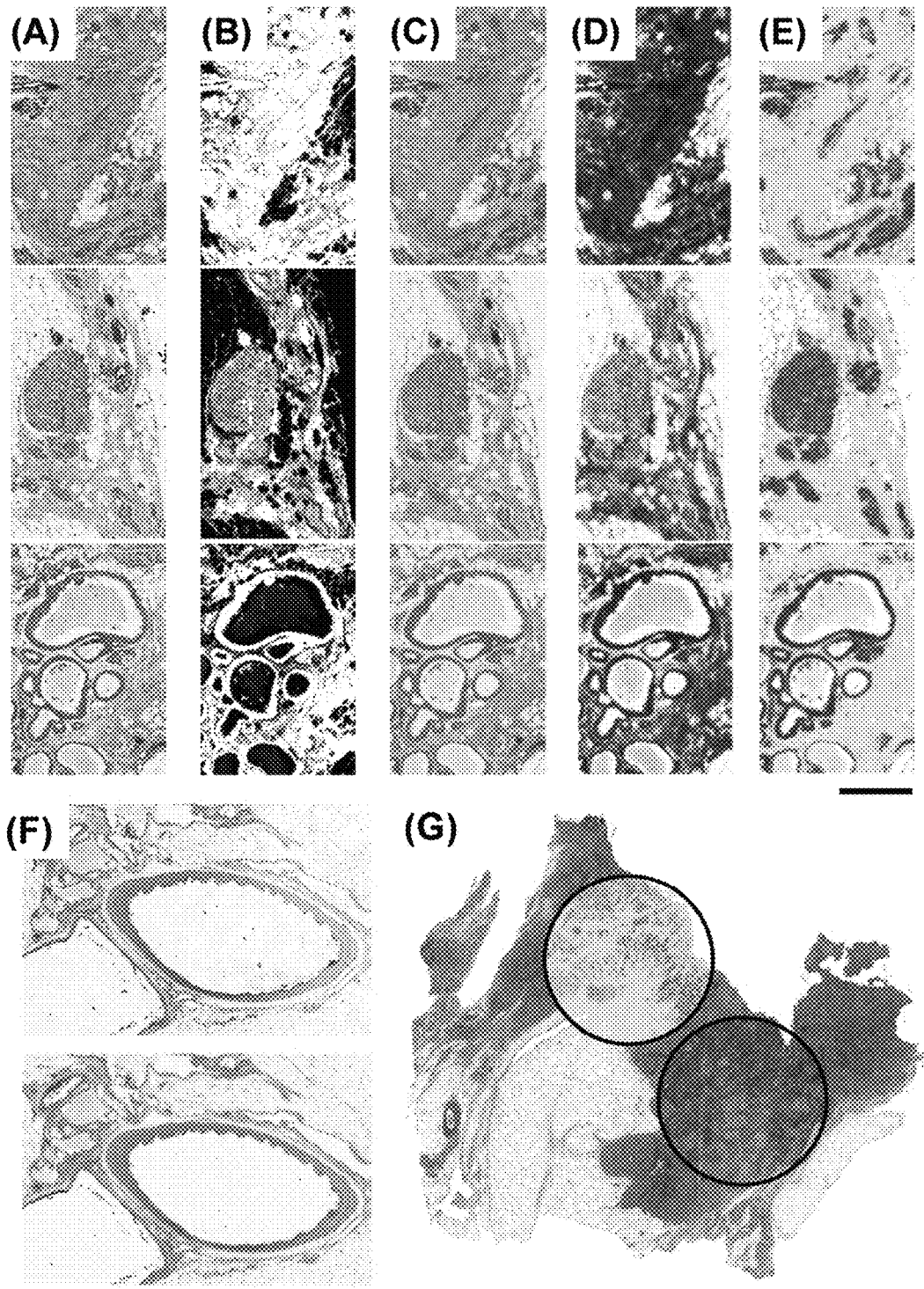
FIGS. 3A-3G are digital images demonstrating that the same sample can be "stained" with many different computational "stains" while also providing consistently uniform, high-quality results. (A) physically-stained H&E image of a series of samples and the corresponding images derived from an unstained sample (B) chemical image at the Amide I vibrational mode, (C) computationally-stained H&E image, (D) computationally-stained Masson's trichrome image, (E) computationally-stained cytokeratin image. The scale bar represents 800 μm. For fields of view typical under a microscope, the digital stains (F, bottom) help prevent artifacts sometimes observed in conventional H&E staining (F, top). The scale bar represents 700 μm. Comprehensive staining is possible for tumor resections (G) where multiple stained images can be generated from the sample for different regions and at different scales. Images can be overlaid, merged or multiply highlighted. The scale bar represents 2.6 mm.

FIGS. 3A-3F show a panel of commons stains, as well as rare cell types, in a breast tissue needle biopsy. Eliminating the need to stain can lead to faster availability of multiple stain-derived results in time-starved settings. Precious or limited samples can be imaged without perturbation and exploratory molecular staining is easily enabled. For example, intra-operative assessment is often required during surgery but is usually restricted to H&E staining. The availability of rapid staining can be accomplished to provide necessary histologic and molecular information. Sometimes, time pressures or variability in naturally derived stains can lead to uneven staining (FIG. 3F, top). Computed stains are always of perfect quality (FIG. 3F, bottom) and provide pristine images for further analysis, thus can replace conventional approaches and provide improved results. In larger surgical resections, different parts of the tissue may be examined easily and stains can be co-registered in the context of the overall architecture of the tissue (FIG. 3G). Thus, the computed histopathology approach is widely applicable and multiply useful in the gamut of pathology activities.

In view of the many possible embodiments to which the principles of the disclosure may be applied, it should be recognized that the illustrated embodiments are only examples of the disclosure and should not be taken as limiting the scope of the invention. Rather, the scope of the disclosure is defined by the following claims. I therefore claim as my invention all that comes within the scope and spirit of these claims.

I claim:

1. A method of imaging a single unstained sample, comprising:
   identifying a group of control samples corresponding to a target stain, wherein the control samples include spectroscopic data and images of a plurality of samples that are stained with the target stain;
   generating a neural network from the group of control samples, wherein the neural network is a feed-forward neural network trained using reduced spectroscopic data from the group of control samples as input, wherein the neural network generates bright-field color data as output;
   obtaining a spectroscopic image of the single unstained sample;
   reducing dimensionality of the spectroscopic image, thereby generating reduced spectroscopic image data; and
   generating an output computed stain image from the reduced spectroscopic image data using the neural network, thereby imaging the unstained sample to represent the target stain.

2. The method of claim 1, wherein the spectroscopic image of the single unstained sample is obtained using IR spectroscopic imaging instrumentation.

3. The method of claim 1, wherein the spectroscopic images of the single unstained sample are obtained using a Fourier transform infrared spectrometer.

4. The method of claim 1, wherein obtaining the spectroscopic images of the single unstained sample comprises obtaining two spatial dimensions and one spectral dimension.

5. The method of claim 1, wherein reducing dimensionality of the spectroscopic image comprises use of principal component analysis (PCA) or a metrics approach.

6. The method of claim 1, further comprising obtaining a bright-field image of the single unstained sample.

7. The method of claim 1, wherein the method detects one or more target proteins or target pathogens.

8. The method of claim 1, wherein the output computed stain image is comparable to an image obtained from staining the single unstained sample.

9. The method of claim 1, wherein the single unstained sample is a biological sample from a mammal.

10. The method of claim 9, wherein the single unstained sample is known or suspected of comprising cancer.

11. The method of claim 10, wherein the cancer is breast, lung, renal, pancreas, prostate, colon, rectal, ovary, or liver cancer.

12. The method of claim 1, wherein the single unstained sample is from an environmental or food source.

13. The method of claim 9, wherein the single unstained sample is known or suspected of comprising a pathogen.

14. The method of claim 13, wherein the pathogen is a bacterium, virus, fungi, protozoa, or bacterial spore.

15. The method of claim 1, wherein the single unstained sample is a fixed, fresh or frozen tissue sample.

16. The method of claim 10, further comprising treating a subject identified as having cancer.

17. The method of claim 1, further comprising selecting a subject having or suspected of having cancer and obtaining a tissue sample from the subject.

18. A non-transitory computer-readable storage medium having instructions thereon that, when executed by a processing system including a processor, facilitate performance of operations, comprising:
   obtaining a spectroscopic image of an unstained sample;
   reducing dimensionality of the spectroscopic image by ignoring particular data of the spectroscopic image, thereby generating a reduced spectroscopic image, wherein the particular data being ignored is determined according to pixels that do not satisfy a threshold absorption;
   inputting the reduced spectroscopic image into a neural network;
   comparing the reduced spectroscopic image to parameters from the neural network of a control sample, wherein the control sample corresponds to a staining process; and
   generating an output computed stain image from the reduced spectroscopic image based on the comparing.

19. A device, comprising:
   a processing system including a processor; and
   a memory that stores executable instructions that, when executed by the processing system, facilitate performance of operations, comprising:
      training a feed-forward network using spectroscopic images from a plurality of training samples as input and associated bright-field color data of a staining process applied to the training samples as output parameters;

obtaining a spectroscopic image of an unstained sample;

reducing dimensionality of the spectroscopic image by ignoring particular data of the spectroscopic image, thereby generating a reduced spectroscopic image;

comparing the reduced spectroscopic image to output parameters of a control sample, wherein the control sample corresponds to a particular staining process; and generating an output computed stain image from the reduced spectroscopic image based on the comparing.

\* \* \* \* \*